(12) United States Patent
Xue et al.

(10) Patent No.: US 10,264,583 B2
(45) Date of Patent: *Apr. 16, 2019

(54) CARRIER SWITCHING METHOD, BASE STATION, AND USER EQUIPMENT

(71) Applicant: Huawei Technologies Co., Ltd., Shenzhen, Guangdong (CN)

(72) Inventors: Lixia Xue, Beijing (CN); Lei Guan, Beijing (CN); David jean-marie Mazzarese, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,811

(22) Filed: Oct. 31, 2017

(65) Prior Publication Data

US 2018/0054824 A1  Feb. 22, 2018

Related U.S. Application Data

(63) Continuation of application No. 14/979,390, filed on Dec. 27, 2015, now Pat. No. 9,839,036, which is a
(Continued)

(51) Int. Cl.
*H04W 72/04* (2009.01)
*H04L 5/14* (2006.01)
*H04L 5/00* (2006.01)

(52) U.S. Cl.
CPC ......... *H04W 72/0453* (2013.01); *H04L 5/001* (2013.01); *H04L 5/006* (2013.01);
(Continued)

(58) Field of Classification Search
CPC ........... H04W 72/0453; H04W 72/048; H04W 72/042; H04L 5/001; H04L 5/006; H04L 5/1469; H04L 5/0098; H04L 5/0053
See application file for complete search history.

(56) References Cited

U.S. PATENT DOCUMENTS 9,839,036 B2 * 12/2017 Xue ................. H04L 5/001
2006/0221894 A1   10/2006 Casaccia et al.
(Continued)

FOREIGN PATENT DOCUMENTS

CN     101018416 A      8/2007
CN     101925130 A     12/2010
(Continued)

OTHER PUBLICATIONS

"Views on cross-carrier resource assignment", Texas Instruments, 3GPP TSG RAN WG1 #58, Aug. 24-Aug. 28, 2009, 2 pages, R1-093595.

*Primary Examiner* — Ivan O Latorre

(57) ABSTRACT

The present invention discloses a carrier switching method, a base station, and user equipment, where the method includes: determining, according to carrier switching capability information of user equipment UE, a carrier switching policy according to which the UE performs carrier switching; and sending carrier switching indication information to the UE, where the carrier switching indication information is used for indicating the carrier switching policy, so that the UE performs carrier switching according to the carrier switching policy. In the carrier switching method, the base station and the user equipment according to embodiments of the present invention, the UE having no carrier aggregation capability is enabled to dynamically perform switching between at least two carriers, so that quality of service of a service of the UE can be improved, user experience can be improved, and system performance can be improved.

19 Claims, 5 Drawing Sheets

Related U.S. Application Data continuation of application No. PCT/CN2013/078194, filed on Jun. 27, 2013.

(52) U.S. Cl.
CPC .......... *H04L 5/0098* (2013.01); *H04L 5/1469* (2013.01); *H04W 72/042* (2013.01); *H04W 72/048* (2013.01); *H04L 5/0053* (2013.01)

(56) References Cited

U.S. PATENT DOCUMENTS

| | | | |
|---|---|---|---|
| 2010/0215011 A1* | 8/2010 | Pan | H04L 5/0064 370/329 |
| 2010/0272067 A1 | 10/2010 | Lu et al. | |
| 2011/0044261 A1 | 2/2011 | Cai et al. | |
| 2011/0170508 A1 | 7/2011 | Xue et al. | |
| 2011/0207495 A1 | 8/2011 | Gerstenberger et al. | |
| 2011/0305290 A1* | 12/2011 | Kim | H04L 5/0007 375/267 |
| 2011/0312326 A1* | 12/2011 | Kwon | H04W 36/0072 455/436 |
| 2012/0087333 A1* | 4/2012 | Huang | H04L 5/001 370/329 |
| 2012/0093112 A1* | 4/2012 | Qu | H04L 5/001 370/329 |
| 2012/0113914 A1* | 5/2012 | Zhao | H04L 5/0007 370/329 |
| 2012/0188886 A1 | 7/2012 | Chen et al. | |
| 2012/0213154 A1 | 8/2012 | Gaal et al. | |
| 2012/0263130 A1* | 10/2012 | Ishikura | H04L 5/001 370/329 |
| 2013/0010709 A1 | 1/2013 | Earnshaw et al. | |
| 2013/0039342 A1 | 2/2013 | Kazmi | |
| 2013/0044711 A1* | 2/2013 | Aiba | H04L 5/001 370/329 |
| 2013/0077523 A1* | 3/2013 | Ko | H04W 24/00 370/252 |
| 2013/0107835 A1* | 5/2013 | Aiba | H04L 5/0007 370/329 |
| 2013/0195058 A1 | 8/2013 | Ode | |
| 2014/0050139 A1 | 2/2014 | Piggin et al. | |
| 2014/0086078 A1 | 3/2014 | Malladi et al. | |
| 2014/0192758 A1 | 7/2014 | Takeda et al. | |
| 2014/0369242 A1* | 12/2014 | Ng | H04W 72/0453 370/280 |
| 2015/0334770 A1 | 11/2015 | Kwon et al. | |
| 2015/0358998 A1* | 12/2015 | Golitschek Edler Von Elbwart | H04W 48/16 370/280 |
| 2016/0006539 A1* | 1/2016 | Nammi | H04L 1/0003 370/329 |

FOREIGN PATENT DOCUMENTS

| | | |
|---|---|---|
| CN | 102006558 A | 4/2011 |
| CN | 102187727 A | 9/2011 |
| CN | 102291793 A | 12/2011 |
| CN | 102340873 A | 2/2012 |
| CN | 102932927 A | 2/2013 |
| RU | 2437250 C2 | 12/2011 |
| WO | 2008/141338 A1 | 11/2008 |
| WO | 2010/104361 A2 | 9/2010 |
| WO | 2011/059373 A1 | 5/2011 |

\* cited by examiner

CARRIER SWITCHING METHOD, BASE STATION, AND USER EQUIPMENT

CROSS-REFERENCE TO RELATED APPLICATIONS

This application is a continuation of U.S. patent application Ser. No. 14/979,390, filed on Dec. 27, 2015, which is a continuation of International Patent Application No. PCT/CN2013/078194, filed on Jun. 27, 2013. All of the aforementioned applications are hereby incorporated by reference in their entireties.

TECHNICAL FIELD

Embodiments of the present invention relate to the field of communications, and in particular, to a carrier switching method, a base station, and user equipment.

BACKGROUND

In the 3rd generation partnership project (3GPP), a carrier aggregation (CA) technology is introduced, so that user equipment (UE) supporting the carrier aggregation technology can send or receive data on more than one component carrier within one transmission time interval, thereby improving a peak rate of the user equipment. In a case of carrier aggregation, multiple pairs of system-associated carriers may be included, where a pair of system-associated carriers denote paired downlink and uplink carriers, that is, carriers corresponding to signaling connection and notification in a system information block 2 (SIB2), and may be considered as a serving cell, the downlink carrier of the system-associated carriers may be considered as a downlink carrier corresponding to the serving cell, and the uplink carrier of the system-associated carriers may be considered as an uplink carrier corresponding to the serving cell. However, some UEs having no carrier aggregation capability also exist in a system, and this type of UEs cannot receive and/or send data on more than one carrier at a same moment, where having no carrier aggregation capability includes: having no carrier aggregation capability on a downlink, having no carrier aggregation capability on an uplink, or having no carrier aggregation capability on both an uplink and a downlink.

On each serving cell and a carrier corresponding to the serving cell, a quantity of user equipment and service distribution are time-variant to some extent, and channel quality of user equipment on each serving cell and a carrier corresponding to the serving cell is also time-variant. After being connected to a base station, user equipment having no carrier aggregation capability can operate only on a time division duplex (TDD) carrier or a pair of system-associated frequency division duplex (FDD) carriers; therefore, channel quality of the user equipment is also affected by a load of this carrier or carrier pair and often changes, causing relatively bad user experience. The present invention provides a carrier switching method, so that user equipment having no carrier aggregation capability can dynamically perform switching between carriers and perform data transmission between the carriers, so as to better match service distribution and dynamic change of channel quality within each carrier, thereby obtaining better system performance and user experience.

SUMMARY

Embodiments of the present invention provide a carrier switching method, a base station, and user equipment, and can enable user equipment having no carrier aggregation capability to dynamically perform switching between carriers and perform data transmission between the carriers.

According to a first aspect, a carrier switching method is provided, including: determining, according to carrier switching capability information of user equipment UE, a carrier switching policy according to which the UE performs carrier switching; and sending carrier switching indication information to the UE, where the carrier switching indication information is used for indicating the carrier switching policy, so that the UE performs carrier switching according to the carrier switching policy.

With reference to the first aspect, in a first possible implementation manner, the determining, according to carrier switching capability information of UE, a carrier switching policy according to which the UE performs carrier switching includes: determining, according to the carrier switching capability information of the UE and current network status information, the carrier switching policy according to which the UE performs carrier switching.

With reference to the first aspect or with reference to the first possible implementation manner of the first aspect, in a second possible implementation manner, the carrier switching policy includes completing carrier switching from a current downlink carrier to a target downlink carrier in an $M1^{th}$ subframe after a current subframe in which the carrier switching indication information is sent to the UE, where M1 is an integer greater than or equal to 1.

With reference to the first aspect or with reference to the first or second possible implementation manner of the first aspect, in a third possible implementation manner, the carrier switching policy includes completing carrier switching from a current uplink carrier to a target uplink carrier in an $M2^{th}$ subframe after the current subframe in which the carrier switching indication information is sent to the UE, where M2 is an integer greater than or equal to 1.

With reference to the third possible implementation manner of the first aspect, in a fourth possible implementation manner, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

With reference to the first aspect or with reference to any possible implementation manner of the first to the fourth possible implementation manners of the first aspect, in a fifth possible implementation manner, the carrier switching indication information is carried in downlink control information DCI, where the DCI is further used for instructing the UE to receive downlink data on the current downlink carrier; or the carrier switching indication information is carried in DCI, where the DCI is further used for instructing the UE to send uplink data on the current uplink carrier or on the target uplink carrier to which carrier switching is performed; or the carrier switching indication information is carried in DCI, where the DCI is used for instructing the UE to perform carrier switching according to the carrier switching policy and is not used for data scheduling.

With reference to the fifth possible implementation manner of the first aspect, in a sixth possible implementation manner, a carrier indicator field CIF included in the DCI is used for carrying the carrier switching indication information.

With reference to the fifth possible implementation manner of the first aspect, in a seventh possible implementation manner, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

With reference to the first aspect or with reference to any possible implementation manner of the first to the seventh possible implementation manners of the first aspect, in an eighth possible implementation manner, before the determining, according to carrier switching capability information of UE, a carrier switching policy according to which the UE performs carrier switching, the method further includes: determining a primary-component-carrier subframe pattern of the UE, where the primary-component-carrier subframe pattern is used for instructing the UE to communicate with a base station in a first subframe by using a primary component carrier of the UE; and the determining, according to carrier switching capability information of UE, a carrier switching policy according to which the UE performs carrier switching includes: determining the carrier switching policy of the UE according to the carrier switching capability information of the UE and the primary-component-carrier subframe pattern.

With reference to the first aspect or with reference to the first possible implementation manner of the first aspect, in a ninth possible implementation manner, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

With reference to the ninth possible implementation manner of the first aspect, in a tenth possible implementation manner, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

With reference to the first aspect or with reference to any possible implementation manner of the first to the tenth possible implementation manners of the first aspect, in an eleventh possible implementation manner, before the determining, according to carrier switching capability information of UE, a carrier switching policy according to which the UE performs carrier switching, the method further includes: receiving the carrier switching capability information of the UE that is sent by the UE.

With reference to the first aspect or with reference to any possible implementation manner of the first to the eleventh possible implementation manners of the first aspect, in a twelfth possible implementation manner, the carrier switching capability information of the UE includes at least one piece of the following information: information about a quantity of carriers supported by the UE, information about a carrier frequency band supported by the UE and information about a carrier switching type supported by the UE.

With reference to the first aspect or with reference to any possible implementation manner of the first to the twelfth possible implementation manners of the first aspect, in a thirteenth possible implementation manner, before the determining, according to carrier switching capability information of UE, a carrier switching policy according to which the UE performs carrier switching, the method further includes: sending first indication information to the UE, where the first indication information is used for indicating a candidate carrier set according to which the UE performs carrier switching and/or a switching time delay for which the UE performs carrier switching.

According to a second aspect, a carrier switching method is provided, including: receiving carrier switching indication information sent by a base station, where the carrier switching indication information is used for indicating a carrier switching policy according to which user equipment UE performs carrier switching; and performing carrier switching according to the carrier switching policy indicated in the carrier switching indication information.

With reference to the second aspect, in a first possible implementation manner, the carrier switching policy includes completing carrier switching from a current downlink carrier to a target downlink carrier in an $M1^{th}$ subframe after a current subframe in which the carrier switching indication information sent by the base station is received, where M1 is an integer greater than or equal to 1.

With reference to the second aspect or with reference to the first possible implementation manner of the second aspect, in a second possible implementation manner, the carrier switching policy includes completing carrier switching from a current uplink carrier to a target uplink carrier in an $M2^{th}$ subframe after the current subframe in which the carrier switching indication information sent by the base station is received, where M2 is an integer greater than or equal to 1.

With reference to the second possible implementation manner of the second aspect, in a third possible implementation manner, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

With reference to the second aspect or with reference to any possible implementation manner of the first to the third possible implementation manners of the second aspect, in a fourth possible implementation manner, the carrier switching indication information is carried in downlink control information DCI, where the DCI is further used for instructing the UE to receive downlink data on the current downlink carrier; or the carrier switching indication information is carried in DCI, where the DCI is further used for instructing the UE to send uplink data on the current uplink carrier or on the target uplink carrier to which carrier switching is performed; or the carrier switching indication information is carried in DCI, where the DCI is used for instructing the UE to perform carrier switching according to the carrier switching policy and is not used for data scheduling.

With reference to the fourth possible implementation manner of the second aspect, in a fifth possible implementation manner, a carrier indicator field CIF included in the DCI is used for carrying the carrier switching indication information.

With reference to the fourth possible implementation manner of the second aspect, in a sixth possible implementation manner, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

With reference to the second aspect or with reference to any possible implementation manner of the first to the sixth possible implementation manners of the second aspect, in a seventh possible implementation manner, before the performing carrier switching according to the carrier switching policy indicated in the carrier switching indication information, the method further includes: determining a primary-component-carrier subframe pattern of the UE, where the primary-component-carrier subframe pattern is used for instructing the UE to communicate with the base station in a first subframe by using a primary component carrier of the UE; and the performing carrier switching according to the carrier switching policy indicated in the carrier switching indication information includes: performing carrier switching according to the carrier switching policy and the primary-component-carrier subframe pattern.

With reference to the second aspect or with reference to the first possible implementation manner of the second aspect, in an eighth possible implementation manner, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

With reference to the eighth possible implementation manner of the second aspect, in a ninth possible implementation manner, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier sub-frame pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

With reference to the second aspect or with reference to any possible implementation manner of the first to the ninth possible implementation manners of the second aspect, in a tenth possible implementation manner, before the receiving carrier switching indication information sent by a base station, the method further includes: sending carrier switching capability information of the UE to the base station, so that the base station determines the carrier switching policy according to the carrier switching capability information.

With reference to the second aspect or with reference to any possible implementation manner of the first to the tenth possible implementation manners of the second aspect, in an eleventh possible implementation manner, the carrier switching capability information of the UE includes at least one piece of the following information: information about a quantity of carriers supported by the UE, information about a carrier frequency band supported by the UE and information about a carrier switching type supported by the UE.

With reference to the second aspect or with reference to any possible implementation manner of the first to the eleventh possible implementation manners of the second aspect, in a twelfth possible implementation manner, before the receiving carrier switching indication information sent by a base station, the method further includes: receiving first indication information sent by the base station, where the first indication information is used for indicating a candidate carrier set according to which the UE performs carrier switching and/or a switching time delay for which the UE performs carrier switching.

According to a third aspect, a base station is provided, where the base station includes: a determining module, configured to determine, according to carrier switching capability information of user equipment UE, a carrier switching policy according to which the UE performs carrier switching; and a sending module, configured to send carrier switching indication information to the UE, where the carrier switching indication information is used for indicating the carrier switching policy determined by the determining module, so that the UE performs carrier switching according to the carrier switching policy.

With reference to the third aspect, in a first possible implementation manner, the determining module is specifically configured to determine, according to the carrier switching capability information of the UE and current network status information, the carrier switching policy according to which the UE performs carrier switching.

With reference to the third aspect or with reference to the first possible implementation manner of the third aspect, in a second possible implementation manner, the carrier switching policy determined by the determining module includes completing carrier switching from a current downlink carrier to a target downlink carrier in an $M1^{th}$ subframe after a current subframe in which the carrier switching indication information is sent to the UE, where M1 is an integer greater than or equal to 1.

With reference to the third aspect or with reference to the first or second possible implementation manner of the third aspect, in a third possible implementation manner, the carrier switching policy determined by the determining module includes completing carrier switching from a current uplink carrier to a target uplink carrier in an M2$^{th}$ subframe after the current subframe in which the carrier switching indication information is sent to the UE, where M2 is an integer greater than or equal to 1.

With reference to the third possible implementation manner of the third aspect, in a fourth possible implementation manner, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

With reference to the third aspect or with reference to any possible implementation manner of the first to the fourth possible implementation manners of the third aspect, in a fifth possible implementation manner, the sending module is specifically configured to send downlink control information DCI carrying the carrier switching indication information, where the DCI is further used for instructing the UE to receive downlink data on the current downlink carrier; or the sending module is specifically configured to send DCI carrying the carrier switching indication information, where the DCI is further used for instructing the UE to send uplink data on the current uplink carrier or on the target uplink carrier to which carrier switching is performed; or the sending module is specifically configured to send DCI carrying the carrier switching indication information, where the DCI is used for instructing the UE to perform carrier switching according to the carrier switching policy and is not used for data scheduling.

With reference to the fifth possible implementation manner of the third aspect, in a sixth possible implementation manner, a carrier indicator field CIF included in the DCI sent by the sending module is used for carrying the carrier switching indication information.

With reference to the fifth possible implementation manner of the third aspect, in a seventh possible implementation manner, the DCI sent by the sending module is scrambled by using a cell identifier corresponding to a target carrier, so as to instruct the UE to switch from a current carrier to the target carrier; or the DCI sent by the sending module instructs the UE to feed back channel state information of the target downlink carrier, so as to instruct the UE to switch from the current downlink carrier to the target downlink carrier.

With reference to the third aspect or with reference to any possible implementation manner of the first to the seventh possible implementation manners of the third aspect, in an eighth possible implementation manner, the determining module is further configured to: before the carrier switching policy according to which the UE performs carrier switching is determined according to the carrier switching capability information of the UE, determine a primary-component-carrier subframe pattern of the UE, where the primary-component-carrier subframe pattern is used for instructing the UE to communicate with the base station in a first subframe by using a primary component carrier of the UE; and determine the carrier switching policy of the UE according to the carrier switching capability information of the UE and the primary-component-carrier subframe pattern.

With reference to the third aspect or with reference to the first possible implementation manner of the third aspect, in a ninth possible implementation manner, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

With reference to the ninth possible implementation manner of the third aspect, in a tenth possible implementation manner, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

With reference to the third aspect or with reference to any possible implementation manner of the first to the tenth possible implementation manners of the third aspect, in an eleventh possible implementation manner, the base station further includes: a receiving module, configured to: before the determining module determines, according to the carrier switching capability information of the UE, the carrier switching policy according to which the UE performs carrier switching, receive the carrier switching capability information of the UE that is sent by the UE.

With reference to the third aspect or with reference to any possible implementation manner of the first to the eleventh possible implementation manners of the third aspect, in a twelfth possible implementation manner, the carrier switching capability information of the UE includes at least one piece of the following information: information about a quantity of carriers supported by the UE, information about a carrier frequency band supported by the UE and information about a carrier switching type supported by the UE.

With reference to the third aspect or with reference to any possible implementation manner of the first to the twelfth possible implementation manners of the third aspect, in a thirteenth possible implementation manner, the sending module is further configured to: before the determining module determines, according to the carrier switching capability information of the UE, the carrier switching policy according to which the UE performs carrier switching, send first indication information to the UE, where the first indication information is used for indicating a candidate carrier set according to which the UE performs carrier switching and/or a switching time delay for which the UE performs carrier switching.

According to a fourth aspect, user equipment UE is provided, including: a receiving module, configured to receive carrier switching indication information sent by a base station, where the carrier switching indication information is used for indicating a carrier switching policy according to which the user equipment UE performs carrier switching; and a carrier switching module, configured to perform carrier switching according to the carrier switching policy indicated in the carrier switching indication information received by the receiving module.

With reference to the fourth aspect, in a first possible implementation manner, the carrier switching policy includes completing carrier switching from a current downlink carrier to a target downlink carrier in an M1$^{th}$ subframe after a current subframe in which the carrier switching indication information sent by the base station is received, where M1 is an integer greater than or equal to 1.

With reference to the fourth aspect or with reference to the first possible implementation manner of the fourth aspect, in a second possible implementation manner, the carrier switching policy includes completing carrier switching from a current uplink carrier to a target uplink carrier in an M2$^{th}$ subframe after the current subframe in which the carrier switching indication information sent by the base station is received, where M2 is an integer greater than or equal to 1.

With reference to the second possible implementation manner of the fourth aspect, in a third possible implementation manner, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

With reference to the fourth aspect or with reference to any possible implementation manner of the first to the third possible implementation manners of the fourth aspect, in a fourth possible implementation manner, the carrier switching indication information received by the receiving module is carried in downlink control information DCI, where the DCI is further used for instructing the UE to receive downlink data on the current downlink carrier; or the carrier switching indication information received by the receiving module is carried in DCI, where the DCI is further used for instructing the UE to send uplink data on the current uplink carrier or on the target uplink carrier to which carrier switching is performed; or the carrier switching indication information received by the receiving module is carried in DCI, where the DCI is used for instructing the UE to perform carrier switching according to the carrier switching policy and is not used for data scheduling.

With reference to the fourth possible implementation manner of the fourth aspect, in a fifth possible implementation manner, a carrier indicator field CIF included in the DCI is used for carrying the carrier switching indication information.

With reference to the fourth possible implementation manner of the fourth aspect, in a sixth possible implementation manner, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

With reference to the fourth aspect or with reference to any possible implementation manner of the first to the sixth possible implementation manners of the fourth aspect, in a seventh possible implementation manner, the UE further includes: a determining module, configured to: before the carrier switching module performs carrier switching according to the carrier switching policy, determine a primary-component-carrier subframe pattern of the UE, where the primary-component-carrier subframe pattern is used for instructing the UE to communicate with the base station in a first subframe by using a primary component carrier of the UE; and the carrier switching module is specifically configured to perform carrier switching according to the carrier switching policy received by the receiving module and the primary-component-carrier subframe pattern determined by the determining module.

With reference to the fourth aspect or with reference to the first possible implementation manner of the fourth aspect, in an eighth possible implementation manner, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

With reference to the eighth possible implementation manner of the fourth aspect, in a ninth possible implementation manner, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

With reference to the fourth aspect or with reference to any possible implementation manner of the first to the ninth possible implementation manners of the fourth aspect, in a tenth possible implementation manner, the UE further includes: a sending module, configured to: before the receiving module receives the carrier switching indication information sent by the base station, send carrier switching capability information of the UE to the base station, so that the base station determines the carrier switching policy according to the carrier switching capability information.

With reference to the fourth aspect or with reference to any possible implementation manner of the first to the tenth possible implementation manners of the fourth aspect, in an eleventh possible implementation manner, the carrier switching capability information of the UE includes at least one piece of the following information: information about a quantity of carriers supported by the UE, information about a carrier frequency band supported by the UE and information about a carrier switching type supported by the UE.

With reference to the fourth aspect or with reference to any possible implementation manner of the first to the eleventh possible implementation manners of the fourth aspect, in a twelfth possible implementation manner, the receiving module is further configured to: before the carrier switching indication information sent by the base station is received, receive first indication information sent by the base station, where the first indication information is used for indicating a candidate carrier set according to which the UE performs carrier switching and/or a switching time delay for which the UE performs carrier switching.

Based on the foregoing technical solutions, in a carrier switching method, a base station, and user equipment provided in the embodiments of the present invention, the UE having no carrier aggregation capability is enabled to dynamically perform switching between at least two carriers, so that quality of service of a service of the UE can be improved, user experience can be improved, and system performance can be improved.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

Figure 1:
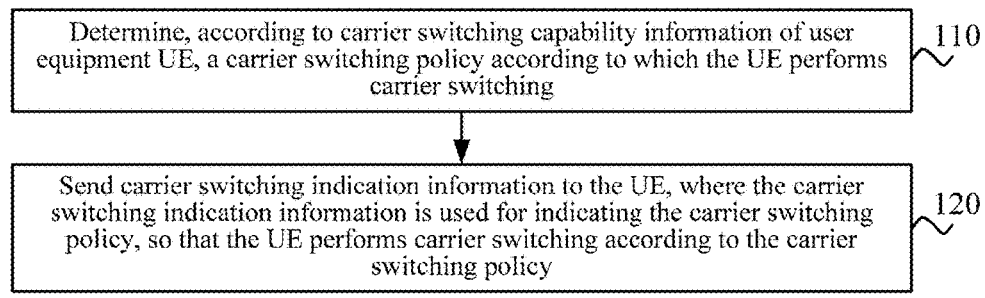
FIG. 1 is a schematic flowchart of a carrier switching method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system or the like.

It should also be understood that in the embodiments of the present invention, user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should be further understood that, in the embodiments of the present invention, a base station may be a base station (BTS) in the GSM or CDMA, and may also be a base station ((NodeB) in the WCDMA, and may further be an evolved NodeB (eNB or e-NodeB) in the LTE. The present invention constitutes no limitation thereto.

It should be further understood that, a carrier switching method provided in the embodiments of the present invention is applicable to a frequency division duplex (FDD) system, a time division duplex (TDD) system, and a hybrid system of frequency division duplex FDD and time division duplex TDD. For convenience of description, an example in which the carrier switching method provided in the embodiments of the present invention is applied to the FDD system is used for performing description below, but the embodiments of the present invention are not limited thereto.

It should be further understood that, the embodiments of the present invention are applicable to UE having no carrier aggregation capability, and the UE may perform switching between at least two carriers, where the at least two carriers may be at least two co-site carriers of a same base station, or at least two carriers of a macro cell and a micro cell of ideal backhaul, or at least two carriers of a macro cell and a micro cell having non-ideal backhaul, but the embodiments of the present invention are not limited thereto. Moreover, in the embodiments of the present invention, when it is not particularly described whether a carrier is an uplink carrier or a downlink carrier, the carrier may refer to an uplink carrier, or may refer to a downlink carrier. Similarly, if there is no particular description, a current carrier may refer to a current uplink carrier or a current downlink carrier, and a target carrier may refer to a target uplink carrier or a target downlink carrier. Additionally, a primary component carrier of UE refers to a carrier used for keeping coverage and a radio resource control (RRC) connection; a secondary component carrier of the UE refers to a carrier, mainly used for transmitting data, on which radio link monitoring and radio link failure determining on an RRC connection do not rely, and UE may have a primary component carrier and at least one secondary component carrier. If there is no particular description, a carrier may be a primary component carrier, or may be a secondary component carrier. If there is no particular description, a primary component carrier may be an uplink primary component carrier, or may be a downlink primary component carrier; and a secondary component carrier may be an uplink secondary component carrier, or may be a downlink secondary component carrier, but the embodiments of the present invention are not limited thereto.

FIG. 1 is a schematic flowchart of a carrier switching method 100 according to an embodiment of the present invention. The method may be performed by a base station, and as shown in FIG. 1, the method 100 includes:

S110: Determine, according to carrier switching capability information of user equipment (UE), a carrier switching policy according to which the UE performs carrier switching.

S120: Send carrier switching indication information to the UE, where the carrier switching indication information is used for indicating the carrier switching policy, so that the UE performs carrier switching according to the carrier switching policy.

Therefore, in the carrier switching method according to this embodiment of the present invention, UE having no carrier aggregation capability is enabled to dynamically perform switching between at least two carriers, so that quality of service of a service of the UE can be improved, user experience can be improved, and system performance can be improved.

This embodiment of the present invention is applicable to UE having no carrier aggregation capability, that is, the UE cannot receive and/or send data on more than one carrier at a same moment. However, in this embodiment of the present invention, the UE may have a carrier switching capability, that is, the UE may separately receive and/or send data on different carriers at different moments. It should be understood that, in this embodiment of the present invention, that the UE has no carrier aggregation capability may refer to that the UE has no uplink carrier aggregation capability but has a downlink carrier aggregation capability, or the UE has no downlink carrier aggregation capability but has an uplink carrier aggregation capability, or refer to that the UE has neither an uplink carrier aggregation capability nor a downlink carrier aggregation capability. Correspondingly, that the UE has a carrier switching capability may refer to that the UE has only an uplink carrier switching capability, or the UE has only a downlink carrier switching capability, or refer to that the UE has both an uplink carrier switching capability and a downlink carrier switching capability, but this embodiment of the present invention is not limited thereto. However, even if the UE has the uplink carrier aggregation capability or the downlink carrier aggregation capability, because the UE has no carrier aggregation capability in the other direction, that is, the downlink carrier aggregation capability or the uplink carrier aggregation capability, it is very difficult to apply the carrier aggregation capability of the UE in practice. For example, in a non-ideal backhaul situation, information between two carriers cannot be transmitted in real time, so that it is very difficult to apply a unidirectional carrier aggregation capability, but this embodiment of the present invention is not limited thereto.

In S110, the carrier switching capability information of the UE may denote information about a specific capability that the UE supports carrier switching. Optionally, the carrier switching capability of the UE may include a carrier baseband processing capability and/or a radio frequency processing capability supported by the UE, and correspondingly, the carrier switching capability information of the UE may include at least one piece of the following information: information about a quantity of carriers supported by the UE, information about a carrier frequency band supported by the UE and information about a carrier switching type supported by the UE. The information about a quantity of carriers supported by the UE may denote that the UE supports maintaining synchronization with N carriers simultaneously, and/or the UE supports performing radio resource management (RRM) measurement or channel state information (CSI) measurement and feedback on N carriers, where N is an integer greater than or equal to 2. The information about a carrier frequency band supported by the UE denotes a frequency band on which the UE separately supports uplink and/or downlink transmission, a downlink carrier frequency band supported by the UE may be different from an uplink carrier frequency band supported by the UE, that is, uplink and downlink carrier frequency band capabilities supported by the UE may be different. The information about a carrier switching type supported by the UE denotes switching between which carriers, of at least three carriers, is supported by the UE when the UE supports the at least three carriers, and the information may include switching between which uplink carriers is supported by the UE and/or switching between which downlink carriers is supported by the UE, but this embodiment of the present invention is not limited thereto.

A carrier switching mechanism of the UE having no carrier aggregation capability may be UE-specific, and is activated by the base station by using high-layer configuration signaling. Optionally, a new UE capability may be defined. Carrier switching may affect a duplex spacing of reception and transmission of the UE, for example, switching is separately performed on uplink and downlink carriers, and in this way, the UE may perform data and signaling transmission with the base station on uplink and downlink carriers that are not system-associated; therefore, a new duplex spacing needs to introduced, which is one of factors for which a new UE capability may be introduced. Factors such as requirements on measurement, a radio frequency structure, and synchronization between multiple carriers may also need to be supported by a new UE capability. Specifically, whether the UE supports a new UE capability may be determined in a UE reporting manner, and if the UE supports the new UE capability, the base station configures and uses the new UE capability, but this embodiment of the present invention is not limited thereto.

Optionally, the carrier switching capability information of the UE may be pre-defined, or before determining the carrier switching policy of the UE, the base station obtains the carrier switching capability information of the UE, where optionally, the base station may obtain the carrier switching capability information by receiving the carrier switching capability information actively sent by the UE, or by receiving the carrier switching capability information that is sent by the UE according to an instruction that is sent by the base station and is used for instructing the UE to send the carrier switching capability information, but this embodiment of the present invention is not limited thereto. Correspondingly, before S110, the method 100 further includes:

S130: Receive the carrier switching capability information of the UE that is sent by the UE.

Optionally, as another embodiment, the base station may also select, according to the carrier switching capability information of the UE and channel state information of carriers supported by the UE, at least two carriers from the carriers supported by the UE to form a candidate carrier set according to which the UE performs carrier switching, so that the UE performs switching between the carriers in the candidate carrier set. The channel state information of the foregoing carriers may be obtained by measuring the carriers. Specifically, the base station may instruct the UE to measure a reference signal sent on downlink carriers, and determine channel state information of the downlink carriers according to a measurement result reported by the UE; and the base station may also instruct the UE to send a reference signal on each uplink carrier, and measure the reference signal on each uplink carrier, so as to determine channel state information of each uplink carrier, but this embodiment of the present invention is not limited thereto.

Optionally, the base station may also determine the carrier switching policy of the UE according to a switching time delay for carrier switching pre-configured by a system, and may notify the UE of the switching time delay for which the UE performs carrier switching, so that the UE and the base station communicate on the basis of consistently understanding the switching time delay for carrier switching, thereby avoiding that the base station needs to notify the UE of the switching time delay each time the base station instructs, by using the switching indication information, the UE to perform carrier switching. Correspondingly, before S110, the method 100 further includes:

S140: Send first indication information to the UE, where the first indication information is used for indicating a candidate carrier set according to which the UE performs carrier switching and/or a switching time delay for which the UE performs carrier switching.

The candidate carrier set may include a primary component carrier and at least one secondary component carrier of the UE, where the primary component carrier is semi-statically configured, and is mainly used for keeping coverage and an RRC connection; the UE performs radio link monitoring and determining on the RRC connection according to the primary component carrier; and the primary component carrier does not change with carrier switching. Optionally, the primary component carrier may also change with carrier switching, that is, a current operating carrier of the UE is the primary component carrier, as the UE performs carrier switching, it means switching of the primary component carrier, and in this case, the UE always performs radio link monitoring and determining on the RRC connection according to the current operating carrier, but this embodiment of the present invention is not limited thereto.

It should be understood that, in this embodiment of the present invention, the switching time delay for which the UE performs carrier switching refers to a time actually consumed by the UE to perform carrier switching, and the switching time delay may include an inherent time delay caused by a capability of the UE itself and an application scenario, and may further include a time delay offset configured by a network side for the UE. The inherent time delay of the UE may change as a carrier switching scenario changes. In a carrier switching situation in which a current carrier and a target carrier are consecutive carriers, a typical value of the inherent time delay is one subframe. In a carrier switching situation in which the current carrier and the target carrier are inter-band, the inherent time delay may differ according to different capabilities of UEs. If UE can support maintaining synchronization with the inter-band current carrier and target carrier, the inherent time delay may be one subframe; for another UE that cannot maintain synchronization with the inter-band current carrier and target carrier, the inherent time delay may reach dozens of subframes, and a specific value thereof depends on a capability of the UE and specific implementation, but this embodiment of the present invention is not limited thereto.

Optionally, the switching time delay may be preset, and it can be known from the foregoing description that, the switching time delay of the UE may change as a scenario changes; therefore, for the switching time delay preset by the system, factors such as a capability of the UE and supporting on all scenarios need to be considered. Optionally, the base station may also configure the switching time delay in advance by using high-layer dedicated signaling or system broadcast signaling, and in this case, the value of the switching time delay may be relatively flexibly configured, but this embodiment of the present invention is not limited thereto.

Optionally, the base station may also dynamically determine, according to a current network status, whether the UE needs to perform carrier switching and determine a target carrier to which the carrier switching is performed. Correspondingly, S110: Determine, according to carrier switching capability information of UE, a carrier switching policy according to which the UE performs carrier switching includes:

S111: Determine, according to the carrier switching capability information of the UE and current network status information, the carrier switching policy according to which the UE performs carrier switching.

The current network status information may include: channel state information of carriers supported by the UE or of carriers in a candidate carrier set that is configured by a base station for the UE, load information of carriers supported by the UE or of carriers in a candidate carrier set that is configured by a base station for the UE, and/or the like. In this way, the base station can better balance loads of the carriers, and provide better quality of service for the UE, but this embodiment of the present invention is not limited thereto.

Optionally, the carrier switching policy may include an uplink carrier switching policy, that is, the UE switches from a current uplink carrier to a target uplink carrier, and keeps a downlink carrier unchanged. Optionally, the carrier switching policy may also include a downlink carrier switching policy, that is, the UE switches from a current downlink carrier to a target downlink carrier, and keeps an uplink carrier unchanged. Optionally, as another embodiment, the carrier switching policy may also include an uplink carrier switching policy and a downlink carrier switching policy, where the uplink carrier switching policy and the downlink carrier switching policy may be the same, that is, the UE completes, in an $M^{th}$ subframe after a current subframe, switching from a current uplink carrier to a target uplink carrier and switching from a current downlink carrier to a target downlink carrier. Optionally, the current uplink carrier and the current downlink carrier may be a pair of system-associated carriers, and the target uplink carrier and the target downlink carrier may be a pair of system-associated carriers. Optionally, the uplink carrier switching policy may be different from the downlink carrier switching policy. Specifically, the uplink carrier switching may be completed in an $M^{th}$ subframe after the current subframe, and the downlink carrier switching may be completed in an $N^{th}$ subframe after the current subframe, where both N and M are integers greater than zero and N≠M, but the target uplink carrier and the target downlink carrier are a pair of system-associated carriers; or both the uplink carrier switching and the downlink carrier switching are completed in an $M^{th}$ subframe after the current subframe, but the target uplink carrier and the target downlink carrier are not system-associated carriers; or the uplink carrier switching and the downlink carrier switching are completed in an $M^{th}$ subframe and an $N^{th}$ subframe after the current subframe respectively, and the target uplink carrier and the target downlink carrier are not system-associated carriers, but this embodiment of the present invention is not limited thereto.

Optionally, the uplink carrier switching policy and/or the downlink carrier switching policy in the carrier switching policy may include beginning to perform switching in an $L^{th}$ subframe after the current subframe and a switching time delay for the carrier switching, where L is an integer greater than or equal to 0. The current subframe denotes a subframe in which the base station sends the carrier switching indication information to the UE, in other words, denotes a subframe in which the UE receives the carrier switching indication information. Specifically, a value of L may be pre-defined by the system, for example, a value of 0 denotes that once receiving the carrier switching indication information in the current subframe, the UE starts carrier switching, and in this case, the base station does not need to notify a beginning time of the carrier switching by using additional signaling, so as to save signaling overheads. Optionally, the base station may also flexibly determine the value of L according to factors such as a service transmission amount of the UE, a feedback time and a carrier that correspond to a data channel, and in this way, the base station may configure, by using specific signaling, the value of L corresponding to carrier switching performed by the UE, but this embodiment of the present invention is not limited thereto.

Optionally, as another embodiment, when both the base station and the UE may learn a switching time delay for carrier switching before the carrier switching, for example, before performing carrier switching, the UE receives first indication information that is sent by the base station and is used for indicating the switching time delay. The base station may also indicate only a time at which the UE completes the carrier switching, that is, indicate that the UE completes switching in an $M^{th}$ subframe after the current subframe, and does not explicitly indicate a beginning time of the carrier switching by using the carrier switching indication information, but implicitly indicates, by using a subframe in which the carrier switching indication information is sent, a beginning time at which the UE performs the carrier switching, where a value of M may depend on the switching time delay for the carrier switching. Specifically, the base station and the UE may preset that the UE begins to perform switching in a current subframe in which the carrier switching indication information is received, and after a switching time delay of T subframes, the base station considers by default that the UE has already completed carrier switching, where T is an integer greater than zero, and in this case, M may be an integer greater than or equal to T. Optionally, the base station and the UE may also preset that the UE begins to perform switching after a subframe offset when receiving the carrier switching indication information, for example, begins to perform switching in an $L^{th}$ subframe after the current subframe, where L is an integer greater than zero, and in this case, M may be an integer greater than or equal to L+T. Optionally, as another embodiment, when the carrier switching needs to be performed after data transmission is performed with the base station, a value of M may also be related to a factor related to data transmission, for example, the base station stipulates that a maximum quantity of times of data transmission is two, where M may be equal to a quantity of subframes that are needed to perform data transmission two times and to send, by the UE, an acknowledgement (ACK) or negative-acknowledgement (NACK) feedback or receive an ACK/NACK feedback sent by the base station, but this embodiment of the present invention is not limited thereto.

Optionally, the carrier switching policy includes completing carrier switching from a current downlink carrier to a target downlink carrier in an $M1^{th}$ subframe after a current subframe in which the carrier switching indication information is sent to the UE, where M1 is an integer greater than or equal to 1.

Optionally, as another embodiment, the carrier switching policy includes completing carrier switching from a current uplink carrier to a target uplink carrier in an $M2^{th}$ subframe after the current subframe in which the carrier switching indication information is sent to the UE, where M2 is an integer greater than or equal to 1.

For values of M1 and M2, reference may be made to the foregoing description for M, which is not described herein again for purpose of conciseness. Moreover, in this embodiment of the present invention, that the UE completes carrier switching in a subframe denotes that the UE can communicate with the base station in the subframe by using a target carrier, but this embodiment of the present invention is not limited thereto.

Optionally, as another embodiment, when the carrier switching policy includes an uplink carrier switching policy and a downlink carrier switching policy, and uplink and downlink carriers before and after the carrier switching are a pair of system-associated carriers each, a time consumed by the UE to perform downlink carrier switching and a time consumed by the UE to perform uplink carrier switching may be different because of different uplink and downlink carrier switching capabilities of the UE. In this case, the base station may configure a time delay offset for the UE, so that a time actually consumed by the UE to perform downlink switching is equal to a time actually consumed by the UE to perform uplink switching; therefore, the UE operates on a pair of system-associated carriers at a same moment, which does not affect data transmission between the base station and the UE, and the UE may always perform data transmission and HARQ feedback according to radio resource configurations of the pair of system-associated carriers. Optionally, even if the uplink and downlink carrier switching capabilities of the UE are the same, the base station may also configure a time delay offset for the UE to separately trigger uplink and downlink carrier switching, so that data transmission of the UE and HARQ feedback corresponding to the data transmission are maintained on a pair of system-associated carriers as much as possible, but this embodiment of the present invention is not limited thereto.

Correspondingly, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Figure 2:
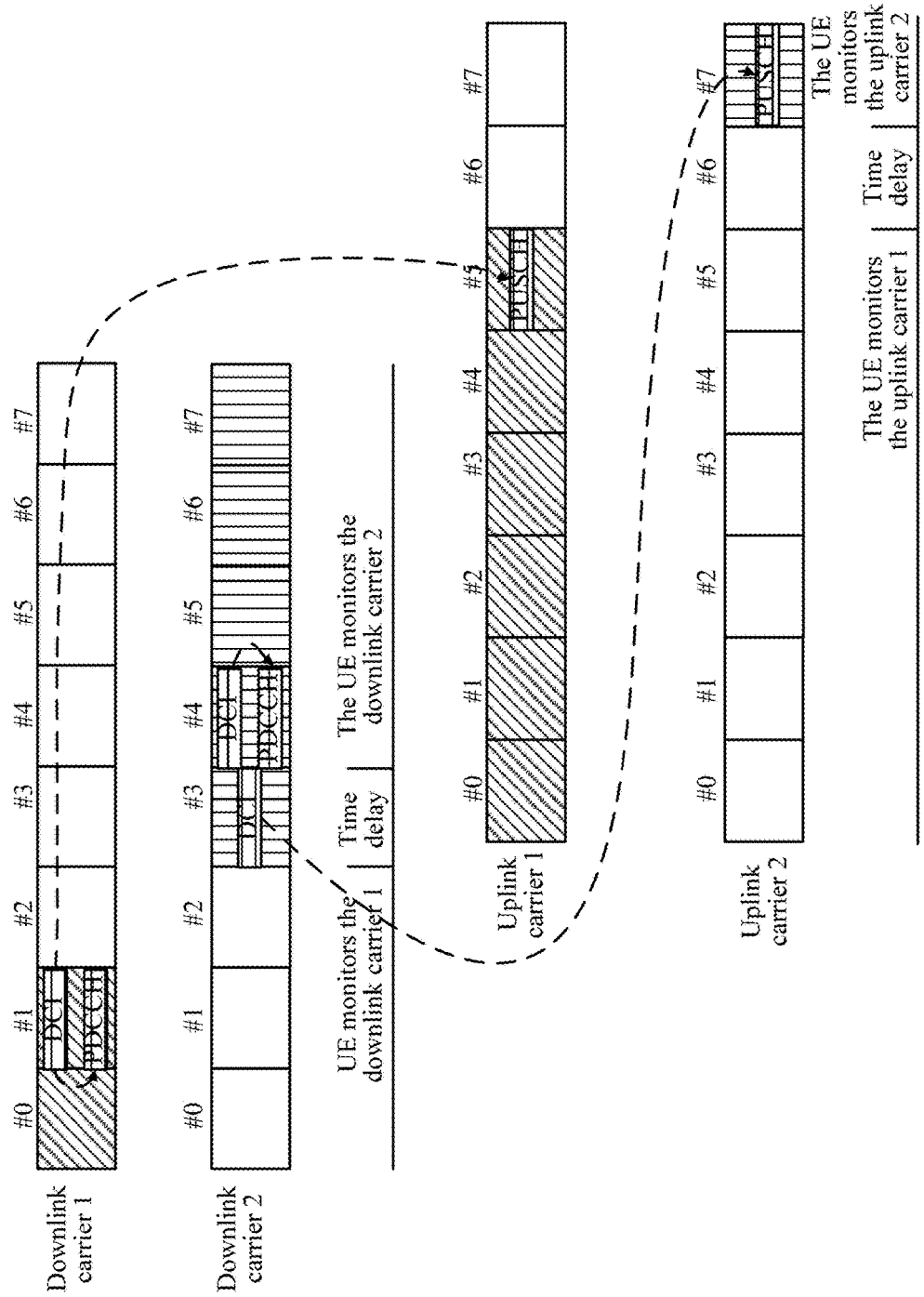
FIG. 2 is a schematic diagram in which a needed time of uplink carrier switching is equal to that of downlink carrier switching in a carrier switching policy according to an embodiment of the present invention.

FIG. 2 is a schematic diagram in which a switching time consumed by uplink carrier switching is equal to that consumed by downlink carrier switching in a carrier switching policy according to an embodiment of the present invention. As shown in FIG. 2, a base station sends DCI to UE in a subframe 1, where the DCI is used for scheduling PDSCH transmission that is on a downlink carrier 1, and instructing the UE to switch from the downlink carrier 1 to a downlink carrier 2. The UE detects the DCI in the subframe 1, receives, according to the DCI, a PDSCH sent by the base station, and performs downlink carrier switching after receiving data. Assuming that a switching time consumed by the switching is one subframe, the UE completes switching from the downlink carrier 1 to the downlink carrier 2 in a subframe 3, and continuously monitors the downlink carrier 2 until the base station triggers the UE again to perform downlink carrier switching. In the subframe 3, the base station schedules PUSCH transmission that is on an uplink carrier 2, and in this case, the base station triggers the UE to switch from an uplink carrier 1 to the uplink carrier 2. Because the UE needs to feed back ACK/NACK to the base station on the uplink carrier 1 that is system-associated with the downlink carrier 1, the UE uses the uplink carrier 1 in a subframe 5 to perform ACK/NACK feedback and then begins to perform uplink carrier switching, and completes uplink carrier switching in a subframe 7. In this way, a switching time consumed by uplink carrier switching of the UE is the same as that consumed by downlink carrier switching of the UE, and the UE completes downlink carrier switching and uplink carrier switching in the subframe 3 and the subframe 7 respectively; therefore, performing, by the base station, data scheduling on the UE is not affected, but this embodiment of the present invention is not limited thereto.

It is worth noting that, an uplink carrier switching process also needs a switching time delay. Optionally, the UE may start switching when receiving signaling used by the base station to schedule an uplink signal, and it is ensured that at a moment when a signal needs to be sent, switching is completed and the signal is sent. However, in different scenarios, switching time delays for which the UE performs carrier switching may be different. In a situation in which a current uplink carrier and a target uplink carrier belong to a same timing advance group (TAG), a switching time delay for which the UE performs uplink carrier switching is a processing time delay brought about in a process of synchronization between the UE and the base station on the target uplink carrier and may not be further considered, and because a timing advance of synchronization between the UE and the base station on the current uplink carrier is equal to a timing advance of synchronization between the UE and the base station on the target uplink carrier, the UE may determine the timing advance of synchronization between the UE and the base station on the target uplink carrier according to the timing advance of synchronization between the UE and the base station on the current uplink carrier, and in this case, no additional switching time delay is needed. However, in a situation in which the current uplink carrier and the target uplink carrier belong to different TAGs, a switching time delay of several subframes may be additionally needed to complete a synchronization process, a specific value of the switching time delay depends on a time in which an uplink performs synchronization, such as, needs to be equal to dozens of milliseconds, and the value of the switching time delay may be configured. In this case, the base station may first trigger to send a random access channel (RACH) to perform carrier switching, and in this way, the switching time delay may not be specifically stipulated, but if the base station still uses another signal triggering manner, besides an existing timing stipulated between a moment at which the UE receives scheduling or configuration signaling of an uplink signal sent by the base station and a moment at which the UE sends a signal, an additional switching time delay is further needed, but this embodiment of the present invention is not limited thereto.

Optionally, the base station may send downlink control information (DCI) carrying the carrier switching indication information, where the DCI may be sent on a physical downlink control channel PDCCH) or an enhanced physical downlink control channel (EPDCCH).

Optionally, the carrier switching indication information is carried in downlink control information DCI, where the DCI is further used for instructing the UE to receive downlink data on the current downlink carrier; or the carrier switching indication information is carried in DCI, where the DCI is further used for instructing the UE to send uplink data on the current uplink carrier or on the target uplink carrier to which carrier switching is performed; or the carrier switching indication information is carried in DCI, where the DCI is used for instructing the UE to perform carrier switching according to the carrier switching policy and is not used for data scheduling.

The carrier switching indication information may be carried in downlink control information DCI, where the DCI may be further used for scheduling the UE to receive a physical downlink shared channel (PDSCH) on a current downlink carrier. Specifically, the DCI may be used for instructing the UE to perform uplink and/or downlink carrier switching, and instructing the UE to receive data sent on the current downlink carrier. For example, the DCI is used for instructing the UE to receive downlink data on the current downlink carrier, and to complete switching from the current downlink carrier to the target downlink carrier in an $M1^{th}$ subframe after the current subframe, and correspondingly, the UE may receive, in the current subframe according to the DCI, the downlink data sent on the current downlink carrier, and perform carrier switching after receiving the downlink data. In this way, even if the DCI is used for instructing the UE to perform downlink carrier switching, it can be also ensured that the existing timing may be used as a timing of the DCI and the PDSCH corresponding to the DCI, that is, downlink DCI and a corresponding PDSCH are transmitted in a same subframe, which does not bring about addition of additional hybrid automatic repeat request (HARD) design or increase of complexity of the UE because a new timing is introduced.

Optionally, as another embodiment, the carrier switching indication information is carried in DCI, where the DCI may be further used for scheduling to send uplink data of a physical uplink shared channel (PUSCH) on the current uplink carrier or on the target uplink carrier to which carrier switching is performed, and moreover the DCI is used for instructing the UE to perform uplink and/or downlink carrier switching, and instructing the UE to send the uplink data to the base station, which may be specifically intra-carrier scheduling or inter-carrier scheduling, where the intra-carrier scheduling refers to scheduling data transmission on an uplink carrier that is system-associated with the current downlink carrier, and the inter-carrier scheduling refers to scheduling data transmission on an uplink carrier that is not system-associated with the current downlink carrier.

When the base station schedules data transmission on different uplink carriers in two consecutive subframes on a same downlink carrier, for example, schedules data transmission of a current uplink carrier in a current subframe, and schedules data transmission of a target uplink carrier in a next subframe of the current subframe, because of a switching time delay of the uplink carriers, the UE cannot perform data transmission on different carriers separately in the two consecutive subframes. In this case, one optional solution is: scheduling of the base station is limited, that is, occurrence of this situation in the base station is avoided; another optional solution is: an information processing priority is set, for example, a priority of feedback of aperiodic CSI is higher than that of sending of a PUSCH, or priorities are set for different uplink carriers, for example, data or a signal is sent on a primary component carrier of the UE preferentially; and another optional solution is: a switching time delay is set within a range of several symbols, and data transmission in a next subframe is compressed within a symbol that is not affected, which may be specifically a special PUSCH whose quantity of symbols is reduced, but this embodiment of the present invention is not limited thereto.

Optionally, when the uplink carrier scheduled by the DCI is not the current uplink carrier of the UE, a situation is: the DCI may also instruct the UE to switch from the current uplink carrier to the target uplink carrier, so that the UE completes transmission, on the target uplink carrier, of uplink data scheduled by the DCI; and in another situation, for example, the DCI also instructs the UE not to perform uplink carrier switching, and in this case, the UE may complete data transmission only on an uplink carrier scheduled by the DCI, and then still operate on the current uplink carrier without performing carrier switching. The UE may also consider that the indication of the DCI sent by the base station is erroneous, and the UE ignores the DCI and performs no operation, but this embodiment of the present invention is not limited thereto, where a specific behavior of the UE may be pre-defined, so that the base station and the UE have the same understanding, thereby implementing unblocked communication, but this embodiment of the present invention is not limited thereto.

Optionally, as another embodiment, the carrier switching indication information is carried in DCI, where the DCI is used for instructing the UE to perform carrier switching according to the carrier switching policy and is not used for data scheduling. In this case, other fields in the DCI may be jointly set to denote invalidity. For example, when the downlink of the UE uses a resource allocation type 0 and a resource allocation type 1, if allocation resources of the DCI are all set to a state 0, it means that no resource is used to perform data transmission, which may indicate that this DCI is not used for data scheduling, but only used for indicating carrier switching; or other manners in which joint field information is not specifically defined may be all used for denoting that the DCI is not used for performing data scheduling, but this embodiment of the present invention is not limited thereto. Optionally, the DCI may be transmitted in any format allowed by the current subframe, but in consideration of a load saving factor, may be transmitted in a format of the shortest DCI, but this embodiment of the present invention is not limited thereto.

Optionally, when the DCI is further used for instructing the UE to receive downlink data sent on the current downlink carrier, and the carrier switching policy includes a downlink carrier switching policy and an uplink carrier switching policy, an offset value may exist between beginning subframes of the uplink carrier switching and the downlink carrier switching. Optionally, when the current uplink carrier and the current downlink carrier of the UE are a pair of system-associated carriers, the offset value may be an integer greater than 4. In this way, the UE may receive the downlink data sent by the base station on the current downlink carrier and perform carrier switching to a downlink carrier in the current subframe, and feed back ACK/NACK to the base station in a fourth subframe after the current subframe by using the current uplink carrier that is system-associated with the current downlink carrier. In this way, the UE may perform feedback by using existing HARQ timing, which does not bring about addition of additional HARQ design and increase of complexity of the UE because a new timing is introduced.

Optionally, as another embodiment, the base station may indicate the carrier switching policy in DCI in a manner of explicitly adding bits, where a quantity of the added bits may depend on a quantity of carriers supported by the UE or a quantity of carriers in a candidate carrier set that is configured by the base station for the UE, and/or depend on a quantity of times of performing carrier switching in the carrier switching policy of the UE, such as, only performing downlink carrier switching, or only performing uplink carrier switching, or performing uplink carrier switching and downlink carrier switching, but this embodiment of the present invention is not limited thereto. Optionally, when the UE supports only two carriers or the candidate carrier set includes only two carriers, only one bit may be added to the DCI, and "0" is used for indicating that carrier switching is not performed, "1" is used for indicating that carrier switching is performed, and the switching is performed from the current carrier to the target carrier in the candidate carrier set, or otherwise. Optionally, two bits may be added to the DCI, where one bit is used for indicating whether to perform uplink carrier switching, and the other bit is used for indicating whether to perform downlink carrier switching, for example, when the two bits are both "1", it denotes that the UE needs to perform uplink carrier switching and downlink carrier switching, but this embodiment of the present invention is not limited thereto.

Optionally, the DCI may multiplex three bits of a carrier indicator field (CIF) of inter-carrier scheduling in a carrier aggregation technology, the CIF is used for indicating a target carrier to which carrier switching is performed, and correspondingly, the carrier indicator field CIF included in the DCI is used for carrying the carrier switching indication information. When the DCI is further used for instructing the UE to receive downlink data on the current downlink carrier, the CIF is only used for indicating carrier switching, where the CIF corresponds to a target carrier index. Whether the UE specifically performs uplink carrier switching and/or downlink carrier switching needs to be determined according to a switching policy, or determined jointly with reference to another piece of indication information. When the DCI is further used for instructing the UE to send uplink data on the current uplink carrier or on the target uplink carrier to which carrier switching is performed, the CIF may instruct the UE to only perform carrier switching, or may indicate both carrier switching and a scheduled uplink carrier. Specifically, the network side may preset a carrier index and a CIF value corresponding to the carrier index for each downlink carrier in the candidate carrier set of the UE and an uplink carrier that is system-associated with the downlink carrier, but this embodiment of the present invention is not limited thereto.

Optionally, when the DCI sent by the base station on the current downlink carrier is used for scheduling data transmission on the current uplink carrier, that is, current carrier scheduling, and an index value of a CIF included in the DCI is not an index of the current carrier, the CIF may instruct the UE to only perform carrier switching, that is, instruct the UE to perform carrier switching from the current downlink and/or uplink carrier to the target downlink and/or uplink carrier corresponding to a CIF index. Whether the UE specifically performs uplink carrier switching and/or downlink carrier switching needs to be determined according to the carrier switching policy, or determined jointly with reference to another piece of indication information. Optionally, when the DCI sent by the base station on the current downlink carrier is used for scheduling data transmission on the target uplink carrier, that is, inter-carrier scheduling, and a value of the CIF included in the DCI is an index of a target carrier, the CIF indicates both data scheduling and carrier switching on the target uplink carrier corresponding to a CIF index, that is, instructs the UE to perform carrier switching from the current uplink carrier to the target uplink carrier. Whether the UE specifically further performs downlink carrier switching needs to be determined according to a switching policy, or determined jointly with reference to another piece of indication information, but this embodiment of the present invention is not limited thereto.

Optionally, as another embodiment, the base station may also indicate the carrier switching policy in DCI in an implicit manner without adding a new bit to the DCI. Optionally, when the UE needs to switch from a current carrier to a target carrier, the base station may send the DCI to the UE on the current downlink carrier, and scramble the DCI by using a cell identifier corresponding to the target carrier, so as to instruct the UE to switch from the current carrier to the target carrier, which includes: the UE may switch from a current downlink carrier to a target downlink carrier, and/or the UE may switch from a current uplink carrier to a target uplink carrier.

Specifically, the DCI may jointly instruct the UE to perform uplink and/or downlink carrier switching while instructing the UE to perform uplink or downlink data scheduling. For example, the base station may send the DCI to the UE on the current downlink carrier, where the DCI is used for scheduling data transmission of the current downlink carrier or the current uplink carrier, and scramble the DCI by using the cell identifier corresponding to the target carrier, so as to instruct the UE to switch from the current carrier to the target carrier. Whether the UE specifically performs uplink carrier switching and/or downlink carrier switching needs to be determined according to a switching policy, or determined jointly with reference to another piece of indication information. For example, when the DCI is used for scheduling downlink data transmission, the UE may be implicitly instructed to switch from the current downlink carrier to the target downlink carrier, while when the DCI is used for scheduling uplink data transmission, the UE may be implicitly instructed to switch from the current uplink carrier to the target uplink carrier, but this embodiment of the present invention is not limited thereto.

Optionally, the base station may also send the DCI to the UE on the current downlink carrier, where the DCI is not used for data scheduling, and scramble the DCI by using the cell identifier corresponding to the target carrier, so as to instruct the UE to switch from the current carrier to the target carrier. Whether the UE specifically performs uplink carrier switching and/or downlink carrier switching needs to be determined according to a switching policy, or determined jointly with reference to another piece of indication information. For example, the DCI may be transmitted in an uplink format, a downlink format or an uplink and downlink unified format to further instruct the UE to perform uplink carrier switching and/or downlink carrier switching, but this embodiment of the present invention is not limited thereto.

Optionally, besides being indicated implicitly by scheduling uplink or downlink data mentioned above, whether the DCI indicates uplink carrier switching and/or downlink carrier switching may be further indicated by performing scrambling by using two different cell identifiers of the target carrier, where one is a true cell identifier of the target carrier, and the other may be a virtual cell identifier of the target carrier. Specifically, when the DCI is scrambled by using the true cell identifier of the target carrier, it indicates that the UE only performs uplink or downlink carrier switching, and whether it specifically indicates uplink or downlink carrier switching may still be indicated implicitly by means of whether the DCI schedules uplink or downlink data; when the DCI is scrambled by using the virtual cell identifier of the target carrier, it indicates that the UE performs both uplink carrier switching and downlink carrier switching, but this embodiment of the present invention is not limited thereto.

Optionally, as another embodiment, the base station may also separately preconfigure, for carriers of the UE, one or more radio network temporary identifiers (RNTI) corresponding to the carriers and a correspondence between each identifier and carrier switching, where the correspondence is used for instructing the UE to perform uplink carrier switching, downlink carrier switching, or perform both uplink carrier switching and downlink carrier switching, and the DCI is scrambled by using an RNTI corresponding to a target carrier, to implicitly instruct the UE to switch from a current carrier to the target carrier, but this embodiment of the present invention is not limited thereto.

Optionally, as another embodiment, the base station may further implicitly instruct the UE to switch from a current downlink carrier to a target downlink carrier by instructing, in DCI, the UE to feed back aperiodic channel state information CSI of the target downlink carrier to the base station. In this way, the UE not only may implement measurement on a channel state of the target downlink carrier, so as to obtain CSI feedback information of the target downlink carrier, but also may perform carrier switching, so as to reduce additional signaling brought about because the base station instructs the UE to perform carrier switching, thereby saving signaling overheads, but this embodiment of the present invention is not limited thereto.

Correspondingly, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

It should be understood that, in this embodiment, a pair of system-associated uplink and downlink carriers have a same cell identifier. The current carrier and the target carrier may denote a current uplink carrier and a target uplink carrier respectively, and correspondingly, the DCI specifically instructs the UE to switch from the current uplink carrier to the target uplink carrier; or the current carrier and the target carrier denote a current downlink carrier and a target downlink carrier respectively, and correspondingly, the DCI is specifically used for instructing the UE to switch from the current downlink carrier to the target downlink carrier; or the current carrier and the target carrier denote a current uplink carrier and a current downlink carrier, and a target uplink carrier and a target downlink carrier respectively, in this case, the target uplink carrier and the target downlink carrier may be a pair of system-associated carriers, and correspondingly, the DCI specifically instructs the UE to switch from the current downlink carrier to the target downlink carrier, and switch from the current uplink carrier to the target uplink carrier that is system-associated with the target downlink carrier, but this embodiment of the present invention is not limited thereto.

Optionally, as another embodiment, the base station may further instruct the UE to perform carrier switching in a manner of combining a carrier subframe pattern and the foregoing dynamic signaling (such as DCI), for example, the network side may configure a carrier subframe pattern of a primary component carrier for the UE in a pre-defined manner, or the base station may preconfigure a carrier subframe pattern of a primary component carrier of the UE for the UE by using high-layer signaling, where the carrier subframe pattern indicates subframes in which the primary component carrier is reserved and used for receiving and/or sending data, and indicates, by using dynamic signaling in a subsequent communication process, a carrier that is used by the UE for receiving and/or sending data in other subframes. The primary-component-carrier subframe pattern configured by the base station has a priority higher than that of the dynamic signaling, and the UE may perform measurement, synchronization, carrier resetting, maintenance of a connection between the UE and the primary component carrier, system message updating and receiving, and the like in reserved subframes of the primary-component-carrier subframe pattern, but this embodiment of the present invention is not limited thereto.

In this embodiment, both the base station and the UE may learn that the other party performs data scheduling or transmission in the reserved subframes of the primary-component-carrier subframe pattern. In this way, both the UE and the base station may determine behaviors of the other party in these subframes, so as to avoid a problem of inconsistent understanding of the UE and the base station brought about because of unreliable receiving of the dynamic signaling. For example, the base station sends carrier switching indication information to instruct the UE to switch from a current downlink carrier to a target downlink carrier, but the UE has not received the carrier switching indication information, and still monitors the current downlink carrier, and in this case, because of inconsistent understanding of the UE and the base station, problems such as potential packet loss and service interruption may be caused. Therefore, a manner of using a carrier subframe pattern may further improve system performance and user experience.

Correspondingly, before S110, the method 100 further includes:

S150: Determine a primary-component-carrier subframe pattern of the UE, where the primary-component-carrier subframe pattern is used for instructing the UE to communicate with a base station in a first subframe by using a primary component carrier of the UE.

Correspondingly, S110: Determine, according to carrier switching capability information of UE, a carrier switching policy according to which the UE performs carrier switching includes:

S112: Determine the carrier switching policy of the UE according to the carrier switching capability information of the UE and the primary-component-carrier subframe pattern.

Optionally, the network side may also configure a carrier subframe pattern of at least one secondary component carrier for the UE in a pre-defined manner or by using high-layer signaling, so as to indicate reserved subframes in which the UE receives and/or sends data by using the at least one secondary component carrier, and for another unreserved subframe, the network side may further indicate, by using dynamic signaling, a carrier that is used by the UE to receive and/or send data in the another subframe, but this embodiment of the present invention is not limited thereto.

For design of a carrier subframe pattern of a primary component carrier and/or at least one secondary component carrier of the UE, factors such as a quantity of candidate activated carriers of the UE, and measurement requirements may be considered, and a reserved subframe may have a relatively long distribution period, so as to satisfy requirements that the UE performs measurement, synchronization, carrier resetting, maintenance of a connection between the UE and the primary component carrier, system message updating and receiving, and the like in reserved subframes of the primary-component-carrier subframe pattern. On a carrier subframe pattern of each carrier, there may be several reserved subframes in dozens of milliseconds. Optionally, subframes reserved for a primary component carrier and/or at least one secondary component carrier of the UE may be orthogonally distributed, and in this way, the UE may determine a carrier used by the UE in each reserved subframe, properly use network resources, and cause no confusion. Moreover, a requirement on a delay for which the UE performs switching between carriers may be further considered, for example, a subframe consumed by carrier switching is not listed as a reserved subframe of any carrier, but this embodiment of the present invention is not limited thereto.

Optionally, because a primary component carrier of the UE needs to be used for maintaining an RRC connection, detecting a system message, and the like, a carrier subframe pattern of the primary component carrier of the UE may be different from a carrier subframe pattern of a secondary component carrier, such as, a location of a reserved subframe, a quantity of reserved subframes, and a period of a reserved subframe. Optionally, a reserved subframe of the primary component carrier may have a relatively short distribution period, such as 40 ms, and reserved subframes of at least one secondary component carrier of the UE may be the same and have longer distribution periods, such as 80 ms, and in this case, there may be an offset between reserved subframes of secondary component carriers, or each secondary component carrier is separately defined. Optionally, a location of a reserved subframe of a carrier subframe pattern of the primary component carrier may be different from that of the secondary component carrier, but this embodiment of the present invention is not limited thereto.

Optionally, when at least two carriers used by the UE to perform carrier switching are carriers of an FDD system, the UE may still perform feedback by using a timing relationship of the FDD system, where data transmission between the UE and the base station and ACK/NACK feedback corresponding to the data transmission may be performed on a pair of system-associated carriers, or may not be performed on a pair of system-associated carriers. If the data transmission and the ACK/NACK feedback corresponding to the data transmission are not performed on system-associated carriers, resources needed by the ACK/NACK feedback may be reserved on each corresponding carrier, and the UE or the base station may perform corresponding feedback according to carrier switching and currently operating uplink and downlink carriers, but this embodiment of the present invention is not limited thereto.

Optionally, each HARQ process and each transmission block of the UE may correspond to only one carrier, that is, initial transmission and retransmission of the transmission block are performed on only one carrier. In this case, besides considering a time sequence relationship between data transmission and ACK/NACK corresponding to the data transmission, a time sequence relationship between initial transmission of data and retransmission of the data needs to be further considered, and specifically, FDD downlink data transmission of LTE uses a time sequence relationship between initial transmission of data and retransmission of the data that are asynchronous; therefore, downlink data retransmission of the UE depends on scheduling of the base station, and is not strictly limited in a time sequence; and FDD uplink data transmission of LTE may use an adaptive synchronization HARQ transmission mechanism, that is, downlink ACK/NACK feedback of uplink data may trigger the UE to perform uplink data retransmission at a fixed retransmission moment, and the base station does not need to perform new retransmission scheduling, the adaptive synchronization HARQ transmission mechanism fixes a time sequence relationship between initial transmission of data and retransmission corresponding to the data, but when both each HARQ process and each transmission block are limited to correspond to one carrier, dynamic carrier switching of the UE or a carrier subframe pattern of a carrier of the UE needs to consider a time sequence of an HARQ timing. In this way, for at least two carriers of different base stations of non-ideal backhaul, each pair of system-associated carriers may be independently operated and scheduled without depending on data transmission between the base station and the UE and ACK/NACK feedback corresponding to the data transmission, but this embodiment of the present invention is not limited thereto.

Optionally, as another embodiment, each HARQ process and each transmission block of the UE may correspond to at least two carriers, that is, initial transmission of the transmission block and retransmission thereof may be performed on the at least two carriers, but each transmission is performed on only one carrier. In this case, HARQ processes on the at least two carriers may be shared, and resources needed for uplink and downlink ACK/NCK feedback need to be separately reserved on each carrier of the at least two carriers, and a data receive end may perform corresponding feedback according to carrier switching. In this way, for at least two carriers of different base stations of ideal backhaul, the at least two carriers may cooperate with each other and be jointly scheduled, dynamic carrier switching or a reserved subframe on a carrier subframe pattern may be configured relatively flexibly without being limited or constrained by an HARQ timing mechanism.

Optionally, the carrier switching method of this embodiment of the present invention may also be applied to a TDD system, and in this case, at least two TDD carriers correspond to different frequency spectrums, but this embodiment of the present invention is not limited thereto. When the at least two carriers used by the UE to perform carrier switching are carriers of the TDD system, the UE may still perform feedback by using a timing relationship of the TDD system. Optionally, each HARQ process and each transmission block may correspond to only one carrier, or may correspond to at least two TDD carriers, and a specific implementation manner thereof is similar to that of the FDD system, which is not described herein again for purpose of conciseness.

Optionally, as another embodiment, the base station may further indicate, completely in a carrier subframe pattern manner, carrier switching performed by the UE in a period of time, a value of the period of time may be determined or pre-defined by the base station according to a current channel state and/or load stability of the at least two carriers, a carrier subframe pattern of a carrier is used for denoting a subframe or subframes reserved and used for the carrier. For convenience of description, a subframe reserved and used for the carrier is referred to as a reserved subframe of the carrier below, but this embodiment of the present invention is not limited thereto.

Correspondingly, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

The base station may notify the UE of the carrier subframe patterns of the at least two carriers in a high-layer signaling manner. The at least two carriers may be carriers in the candidate carrier set that is configured by the base station for the UE, and may include a primary component carrier and at least one secondary component carrier, or include at least two secondary component carriers. Moreover, for design performed by the base station on the carrier subframe patterns, factors such as a quantity of the carriers in the candidate carrier set of the UE, and a service transmission amount on each carrier need to be considered. Preferably, carrier subframe patterns of different carriers are completely orthogonal, that is, reserved subframes of different carriers are not overlapped with each other, and in this way, the UE may determine a carrier used by the UE in each subframe, properly use network resources, and cause no confusion. Optionally, for design of the carrier subframe patterns of the at least two carriers, a requirement on a delay for which the UE performs switching between carriers may be further considered, that is, a subframe consumed by carrier switching performed by the UE is not listed as a reserved subframe of any carrier, but this embodiment of the present invention is not limited thereto.

Specifically, in the carrier subframe patterns of the at least two carriers, reserved subframes of the carriers are orthogonal, and may be configured by means of staggered distribution, so that the UE monitors only one carrier in a same subframe. Optionally, the base station may set different priorities for the at least two carriers, so that when the carrier subframe patterns of the at least two carriers are overlapped after being combined, the UE may preferentially monitor a carrier having a higher priority, such as, the primary component carrier of the UE. Optionally, the carrier subframe patterns of the at least two carriers may include all subframes in the period of time as much as possible after being combined, or include all other subframes in the period of time after being combined except a subframe needed by a switching time delay, so that the UE has a potentially available resource in each subframe. If there are still some subframes in which no carrier is reserved and used after the carrier subframe patterns of the at least two carriers are combined, the system may use the primary component carrier by default, and in this way, the UE may monitor the primary component carrier by default, but this embodiment of the present invention is not limited thereto.

Optionally, as another embodiment, the reserved subframes of the at least two carriers may be periodically distributed, and have different distribution periods; or the reserved subframes of the at least two carriers have a same distribution period, but there is an offset value between initial locations of the reserved subframes. Optionally, a carrier subframe pattern of the primary component carrier of the UE may be different from a carrier subframe pattern of another carrier, such as, a location of a reserved subframe, a quantity of reserved subframes, and a period of a reserved subframe, but this embodiment of the present invention is not limited thereto.

Figure 3:
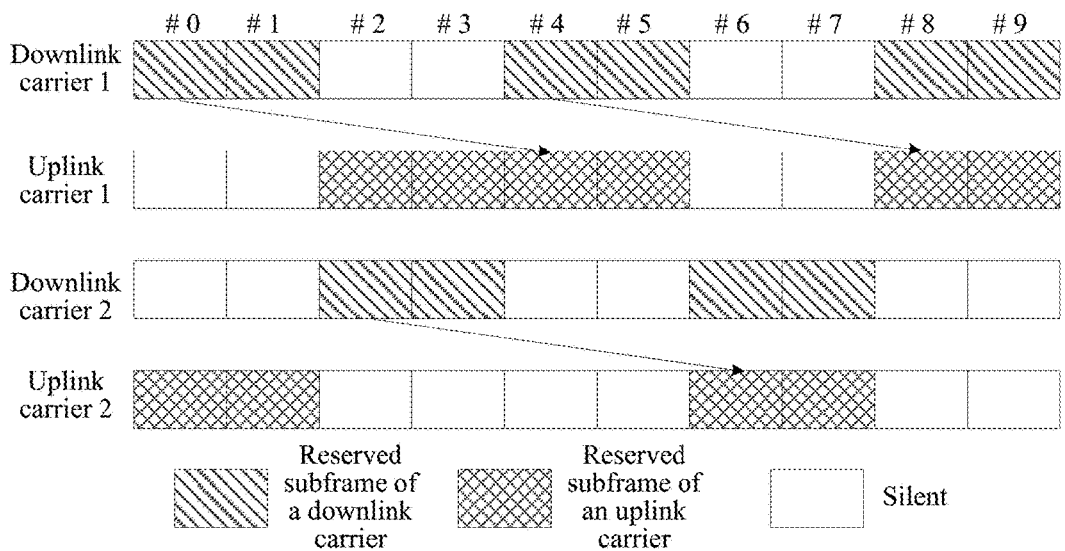
FIG. 3 is a schematic diagram of a first carrier subframe pattern according to an embodiment of the present invention.

Optionally, in a case of at least two candidate FDD carrier sets for which the UE performs carrier switching, the UE may still perform feedback by using the timing relationship of the FDD system. As shown in FIG. 3, the distribution periods of the reserved subframes of the at least two carriers are 10 ms. Reserved subframes of the downlink carrier 1 are subframes 0, 1, 4, 5, 8 and 9, and after the UE receives downlink data in the foregoing subframes, subframes in which the UE performs ACK/NACK feedback are reserved, that is, reserved subframes of the uplink carrier 1 that is system-associated with the downlink carrier 1 are subframes 4, 5, 8, 9, 2 and 3; and reserved subframes of the downlink carrier 2 are subframes 2, 3, 6 and 7, and correspondingly, reserved subframes of the uplink carrier 2 that is system-associated with the downlink carrier 2 are subframes 6, 7, 0 and 1. It can be seen that, carrier subframe patterns of the downlink carrier 1 and the downlink carrier 2 are orthogonally distributed. Optionally, each HARQ process and each transmission block may correspond to only one carrier, that is, both initial transmission and retransmission of the transmission block are performed on a same carrier. In this case, for FDD uplink transmission of LTE, a carrier subframe pattern of the primary component carrier or carrier subframe patterns of all carriers of the UE may use a common multiple of a quantity (such as 10) of subframes included in a radio frame and an HARQ timing time sequence (such as 8) as a distribution period of a reserved subframe, a specific carrier subframe pattern thereof may be configured according to an HARQ timing time sequence relationship, and preferably, a minimum common multiple (such as 40) of the quantity of the subframes included in the radio frame and the HARQ timing time sequence may be selected as a distribution period of a reserved subframe, so as to save signaling overheads. In this way, for at least two carriers of different base stations of non-ideal backhaul, each pair of system-associated carriers may be independently operated and scheduled without depending on data transmission between the base stations and ACK/NACK feedback of the data transmission, but this embodiment of the present invention is not limited thereto.

Optionally, as another embodiment, each HARQ process and each transmission block may correspond to at least two carriers, that is, initial transmission and retransmission of the transmission block may be performed on the at least two carriers, but each transmission is performed on only one carrier, and for specific configuration thereof, reference may be made to the foregoing corresponding embodiment in which a carrier subframe pattern and dynamic signaling are combined and used, which is not described herein again for purpose of conciseness.

Optionally, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Figure 4:
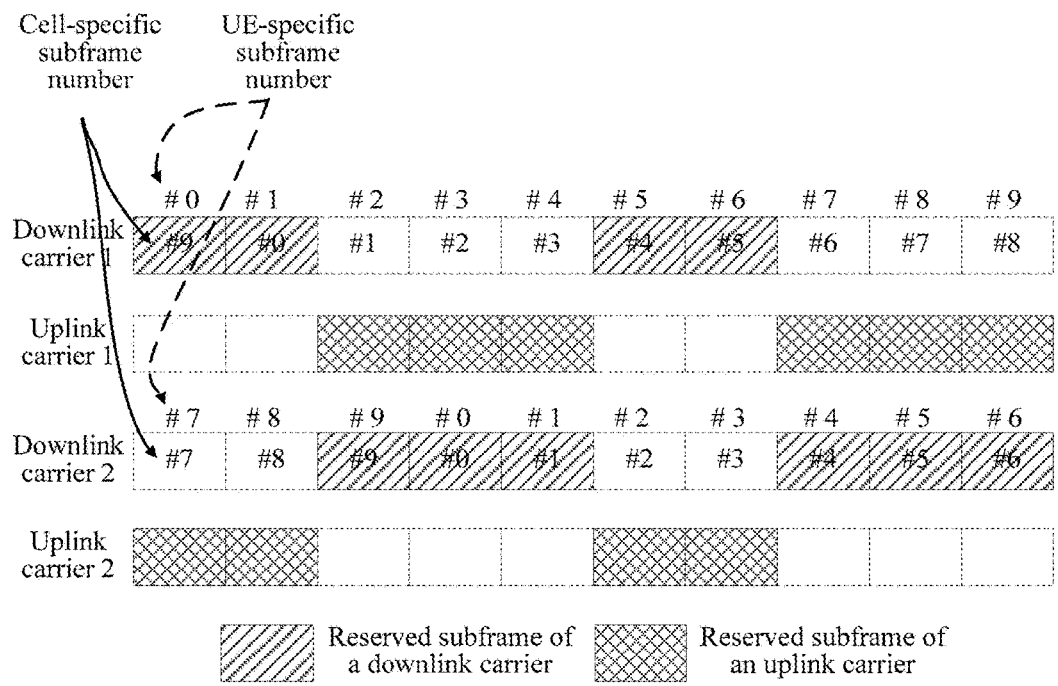
FIG. 4 is a schematic diagram of a second carrier subframe pattern according to an embodiment of the present invention.

When the at least two carriers used by the UE to perform carrier switching are carriers of the FDD system, the UE may also perform feedback and transmit a periodic signal in a manner similar to that in the TDD system, such as, a manner of using an HARQ timing time sequence of TDD. For convenience of understanding, a ratio between a quantity of reserved uplink subframes of an uplink carrier and a quantity of reserved downlink subframes of a downlink carrier in a same period of time is referred to as a quasi-TDD ratio between uplink subframes and downlink subframes below, where the uplink carrier and the downlink carrier are a pair of system-associated carriers. For example, in the at least two carrier subframe patterns, quasi-TDD ratios between uplink subframes and downlink subframes of two pairs of system-associated uplink and downlink carriers may be reciprocals of each other, and are configurations of ratios between uplink subframes and downlink subframes of the existing TDD system. As shown in FIG. 4, a quasi-TDD ratio between uplink subframes and downlink subframes used by the uplink carrier 1 and the downlink carrier 1 that are system-associated is 2:3, and corresponds to a configuration 0 of the existing TDD system, and a quasi-TDD ratio between uplink subframes and downlink subframes used by the uplink carrier 2 and the downlink carrier 2 that are system-associated is 3:2, and corresponds to a configuration 1 of the existing TDD system. In this way, the UE may still perform feedback on each carrier pair by using the existing HARQ timing relationship corresponding to the TDD ratio between uplink subframes and downlink subframes without introducing a new HARQ timing time sequence and feedback mechanism, and reuse a relatively common ratio configuration that embodies uplink and downlink services in the existing TDD system, thereby optimizing system configuration. In particular, in a case of at least two carriers of different base stations of non-ideal backhaul, each pair of system-associated carriers may be independently operated and scheduled according to a respective configuration of the carrier pair without depending on data transmission between the base stations and ACK/NACK feedback of the data transmission.

Optionally, when the at least two carriers used by the UE to perform carrier switching are carriers of the FDD system, and the at least two carriers use carrier subframe patterns similar to that of the TDD uplink and downlink configuration, if the existing HARQ timing time sequence of TDD is reused, a sequence and serial numbers for subframes of the UE may keep consistent with those of the TDD system. For example, as shown in FIG. 4, a UE-specific subframe sequence relationship may be introduced for the UE that performs carrier switching, to correspond to locations of uplink and downlink subframes in a radio frame and serial numbers of the subframes in the existing TDD uplink and downlink subframe configuration. However, because the at least two carriers themselves are carriers of the FDD system, and particularly for the primary component carrier, because user equipment that communicates by using only the carrier still exists, it needs to be considered that subframes used to satisfy requirements such as synchronization and reception of a system message and a paging message are reserved to keep consistent with the existing FDD system, so as to keep compatibility of the carrier, so that the UE may keep an RRC connection and normal communication on the primary component carrier of the UE, but in the existing FDD system, it is stipulated that a paging message can be transmitted in only subframes in each radio frame whose subframe numbers are 0, 4, 5 and 9, and other operations such as the synchronization and the reception of the system message may also be performed in these subframes. In this way, from the viewpoint of the network side, for a sequence of subframe numbers of subframes, reference may be made to digits in each subframe block in FIG. 4; therefore, the UE performing carrier switching needs to maintain an additional group of UE-specific subframe numbers to be used for maintaining the HARQ mechanism, and also to maintain a group of cell-specific subframe numbers to perform synchronization with the base station, and receive a system message and a paging message, but this embodiment of the present invention is not limited thereto.

Optionally, an offset value may exist between the UE-specific subframe number and the cell-specific subframe number, FIG. 4 is used as an example, for a carrier 1, a UE-specific subframe number is an offset to the left by one subframe relative to a cell-specific subframe number, a specific offset may depend on a TDD ratio between uplink subframes and downlink subframes used by this carrier and the cell-specific subframe number needs to be reserved; further, a TDD ratio between uplink subframes and downlink subframes on a carrier 2 further needs to be also considered, an offset value also needs to exist between a UE-specific subframe number corresponding to the carrier 2 and the UE-specific subframe number corresponding to the carrier 1, this offset value is mainly to ensure that a sequence relationship of subframe numbers for each carrier corresponds to the existing TDD uplink and downlink subframe configuration used by the carrier, and specific locations of uplink and downlink subframes in a radio frame and serial numbers of the subframes in the TDD uplink and downlink subframe configuration, and for a sequence of UE-specific subframe numbers on the carrier 2, reference may be made to digits above a subframe block of the carrier 2 in FIG. 4.

Additionally, it needs to be emphasized that, a cell-specific subframe that needs to be reserved on each FDD carrier may also be considered according to use of the FDD carrier itself. For a primary component carrier, it needs to be considered that subframes for performing synchronization and reception of a system message and a paging message are reserved, so that the UE may keep an RRC connection and normal communication on the primary component carrier of the UE; and for a secondary component carrier on which the UE performs carrier switching, which subframes are reserved needs to be considered according to a type and a configuration of the secondary component carrier, so that the UE may normally communicate on the secondary component carrier. Specifically, one carrier type is a backward compatible carrier, each subframe transmits a cell-specific reference signal, and the UE may track time frequency synchronization and/or perform RRM measurement according to the cell-specific reference signal. Another carrier type is a new carrier type, this type of carrier only sends a cell-specific reference signal in a period in some and predefined subframes, and in this way, the UE needs to monitor this carrier in these subframes to track time frequency synchronization with this carrier and/or perform RRM measurement, but this embodiment of the present invention is not limited thereto.

Optionally, a carrier type relationship between the primary component carrier and the secondary component carrier may include two situations, where one situation is: the secondary component carrier and the primary component carrier are of a same carrier type, and both are backward compatible carriers. In this case, each subframe of a backward compatible carrier transmits a cell-specific reference signal; therefore, no specific requirement is imposed on a subframe reserved on the secondary component carrier. The other situation is: either the primary component carrier or the secondary component carrier is of a new carrier type, and in this case, it is considered that a subframe is reserved on either of the two carriers. Specifically, in a situation in which the primary component carrier is of the new carrier type, transmission of the cell-specific reference signal needs to be limited in a paging subframe, and additional limitation needs to be considered for a subframe reserved on the primary component carrier; and in a situation in which the secondary component carrier is of the new carrier type, reservation of a subframe on the secondary component carrier needs to consider to include a subframe in which the cell-specific reference signal is transmitted. For example, the cell-specific reference signal is transmitted in subframes whose subframe numbers mod 5 are 0, these subframes need to be reserved to be used by the secondary component carrier; and moreover, staggered configuration of the secondary component carrier and the primary component carrier needs to be considered, and an offset value may also exist between cell-specific subframe numbers of the primary and secondary component carriers. For example, as shown in FIG. 4, the cell-specific subframe number of the secondary component carrier is an offset to the right by two subframes relative to the cell-specific subframe number of the primary component carrier, and for a specific cell-specific subframe number, reference may be made to a digit in each subframe block in the carrier 2. Further, the primary component carrier and the secondary component carrier may have a same duplex standard, such as, be a same FDD or TDD system; or the primary component carrier and the secondary component carrier have different duplex standards, but this embodiment of the present invention is not limited thereto.

Optionally, when quasi-TDD ratios between uplink subframes and downlink subframes of two pairs of system-associated uplink and downlink carriers are reciprocals of each other, a combination of carrier subframe patterns of the two carriers may enable the UE to communicate with the base station with potential available uplink and downlink resources in each subframe. Additionally, other periodic CSI and SRS feedback may be also performed with reference to the timing relationship of the existing TDD system, but this embodiment of the present invention is not limited thereto.

Optionally, as another embodiment, in the carrier subframe patterns of the at least two carriers, quasi-TDD ratios between uplink subframes and downlink subframes of two pairs of system-associated uplink and downlink carriers may be reciprocals of each other, but the TDD ratios between uplink subframes and downlink subframes may not completely correspond to ratios between uplink subframes and downlink subframes of the existing TDD system. For example, a quasi-TDD ratio between uplink subframes and downlink subframes used by a pair of system-associated uplink carrier and downlink carrier is 4:1, and corresponds to a ratio between uplink subframes and downlink subframes 4:1 of the existing TDD system, that is, a configuration 2 in Table 1, and a quasi-TDD ratio between uplink subframes and downlink subframes used by another pair of system-associated uplink carrier and downlink carrier is 1:4, but does not correspond to any ratio between uplink subframes and downlink subframes of seven ratios between uplink subframes and downlink subframes shown in Table 1 of the existing TDD system. In this case, a system-associated carrier corresponding to a ratio between uplink subframes and downlink subframes of the existing TDD system may be preferentially defined as a primary component carrier of the UE, the UE may perform feedback on the primary component carrier by using the existing HARQ timing relationship corresponding to the TDD ratio, and periodic CSI and SRS feedback performed on the primary component carrier may be also performed with reference to the timing relationship, of the existing TDD system, corresponding to the TDD ratio. Moreover, another pair of system-associated carriers described above may be defined as secondary component carriers of the UE, a newly defined time sequence relationship may be used as the HARQ timing thereof, or some feedback is performed on the primary component carrier, and a time sequence relationship between the pair of system-associated carriers is not limited in this embodiment of the present invention. In this way, service transmission of the primary component carrier, and network connection and an HARQ mechanism of the service transmission in an effective multiplexing TDD system can be effectively ensured, and particularly, in a case of at least two carriers of different base stations of non-ideal backhaul, each pair of system-associated carriers may be independently operated and scheduled according to a respective configuration of the carrier pair, and transmission of the primary component carrier can be ensured without depending on intercommunication data between the base stations and ACK/NACK feedback of the intercommunication data.

Optionally, in another embodiment, when the at least two carriers used by the UE to perform carrier switching are carriers of the FDD system, carrier subframe patterns of the at least two carriers may further use a format of a quasi-TDD subframe ratio to denote reserved subframes of the at least two carriers, for example, as shown in Table 1, the candidate carrier set that is configured by the base station for the UE includes two carriers, where one may be defined as a primary component carrier, and the other may be defined as a secondary component carrier, and the UE may perform carrier switching between the primary component carrier and the secondary component carrier.

TABLE 1

A carrier subframe pattern uses a format of a quasi-TDD ratio

| Carrier subframe pattern configuration | Period (ms) | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | P | P | S | S | S | P | P | S | S | S |
| 1 | 5 | P | P | S | S | P | P | P | S | S | P |
| 2 | 5 | P | P | S | P | P | P | P | S | P | P |
| 3 | 10 | P | P | S | S | S | P | P | P | P | P |
| 4 | 10 | P | P | S | S | P | P | P | P | P | P |
| 5 | 10 | P | P | S | P | P | P | P | P | P | P |
| 6 | 5 | P | P | S | S | S | P | P | S | S | P |

P denotes a primary component carrier, S denotes a secondary component carrier, P corresponds to a downlink subframe and a special subframe in a TDD system, and S corresponds to an uplink subframe in the TDD system; in this case, the special subframe in the TDD system may be considered as a normal downlink subframe, and a channel transmission mechanism is configured and controlled by using a reference signal of the normal downlink subframe. There are totally seven carrier subframe pattern configurations 0 to 6 in Table 1, and Table 1 separately shows carrier types of the seven carrier subframe pattern configurations that are reserved in all subframes in a radio frame. For example, for the carrier subframe pattern configuration 0, a repetition period of a carrier subframe pattern is 5 ms, the UE reserves and uses a primary component carrier in subframes 0 and 1, and reserves and uses a secondary component carrier in subframes 2, 3 and 4, and patterns of previous five subframes are repeated in subframes 5 to 9; and for the carrier subframe pattern configuration 3, a repetition period of a carrier subframe pattern is 10 ms, and the UE reserves and uses a secondary component carrier in subframes 2, 3 and 4, and reserves and uses a primary component carrier in the rest subframes. The carrier subframe pattern configuration shown in Table 1 may be only applied to a subframe pattern configuration of a downlink carrier or an uplink carrier, that is, P and S denote a primary uplink carrier and a secondary uplink carrier respectively, or denote a primary downlink carrier and a secondary downlink carrier respectively, a subframe pattern configuration of a carrier in another direction corresponding to the carrier subframe pattern configuration may depend on other configuration information of the base station; or the manner may be applied to subframe pattern configurations of both an uplink carrier and a downlink carrier, and subframe numbers in the subframe pattern configurations of the uplink and downlink carriers may be in a one-to-one correspondence, but this embodiment of the present invention is not limited thereto.

Optionally, when carrier subframe patterns of two candidate FDD carriers on which the UE performs carrier switching use a format of a quasi-TDD subframe ratio, and the format of the quasi-TDD subframe ratio is only applied to a downlink carrier, an uplink carrier on which the UE operates may be any one of two candidate FDD uplink carriers used by the UE to perform carrier switching, and may preferably be an uplink primary component carrier. In this way, both uplink feedback for uplink data transmission and uplink feedback for downlink data transmission may be completed on this uplink carrier, and the HARQ timing relationship of the FDD system may be still used. Particularly, in a case of at least two carriers of different base stations of ideal backhaul, two carriers may cooperate with each other and be jointly scheduled; therefore, the HARQ timing mechanism and feedback for downlink data may be flexibly configured.

Similarly, when the carrier subframe pattern of the quasi-TDD subframe ratio is applied to an uplink carrier, a downlink carrier on which the UE operates may be any one of two candidate FDD downlink carrier sets used by the UE to perform carrier switching, and may preferably be a downlink primary component carrier. In this way, uplink transmission load may be balanced, and particularly, for a heterogeneous macro/micro deployment network, the UE sends uplink data and a control channel to a small-cell base station in some subframes. Particularly, when the UE is relatively close to the small-cell base station, transmit power of the UE may be saved, thereby reducing power consumption of the UE.

Optionally, the format of the quasi-TDD subframe ratio used by the carrier subframe pattern may be also applied to carrier subframe pattern configurations of both an uplink carrier and a downlink carrier, and subframe numbers in the subframe pattern configurations of the uplink and downlink carriers may be in a one-to-one correspondence. For example, in the carrier subframe pattern configuration 0, an uplink primary component carrier and a downlink primary component carrier that is system-associated with the uplink primary component carrier are reserved and used in the subframe 0 and the subframe 1, and an uplink secondary component carrier and a downlink secondary component carrier that is system-associated with the uplink secondary component carrier are reserved and used in the subframes 2, 3 and 4. Optionally, there may be an offset value between subframe numbers in subframe pattern configurations of the uplink and downlink carriers, for example, in the carrier subframe pattern configuration 0, an uplink primary component carrier is reserved and used in the subframe 0 and the subframe 1, and a downlink primary component carrier that is system-associated with the uplink primary component carrier is reserved and used and in the subframe 4 and the subframe 5, there is an offset of four subframes between reserved subframes of the uplink primary component carrier and the downlink primary component carrier, but this embodiment of the present invention is not limited thereto.

Optionally, in a method for indicating carrier switching by using dynamic DCI signaling, or in a method for indicating carrier switching of the UE in a period of time completely in a carrier subframe pattern manner, or for instructing the UE to perform carrier switching in a manner of combining a carrier subframe pattern and dynamic signaling, for configuration and transmission of uplink periodic signals CSI and SRS, available subframes of each uplink carrier need to be considered, and for a method for configuring a carrier subframe pattern, an optional manner is to use a fixed period, such as 10 ms, so that each transmission of the uplink signal definitely occurs on a fixed carrier. Moreover, for the method for dynamically indicating available subframes of each carrier or the method for combining a carrier subframe pattern and dynamic signaling, one manner is to flexibly configure the feedback period, such as 5 ms. In this case, when a transmission moment arrives and a current subframe is not an available subframe of a current carrier, the UE may discard transmission of a current periodic signal, or determine whether to transmit the periodic signal according to whether another signal or data is transmitted on a carrier corresponding to the current subframe at a current moment, and if another signal or data is transmitted on the carrier corresponding to the current subframe at the current moment, the UE may still send the another signal or data on the carrier corresponding to the current subframe, and also discard sending of the periodic signal; or if another signal or data is not transmitted on the carrier corresponding to the current subframe at the current moment, the UE sends the periodic signal on the carrier corresponding to the current subframe, but this embodiment of the present invention is not limited thereto.

Therefore, in the carrier switching method according to this embodiment of the present invention, UE having no carrier aggregation capability is enabled to dynamically perform switching between at least two carriers, so that quality of service of a service of the UE can be improved, system load can be balanced, user experience can be improved and system performance can be improved.

The carrier switching method according to this embodiment of the present invention is described in detail from the viewpoint of a base station with reference to FIG. 1 and FIG. 4 above, and a carrier switching method according to an embodiment of the present invention is described in detail from the viewpoint of UE with reference to FIG. 5 below.

Figure 5:
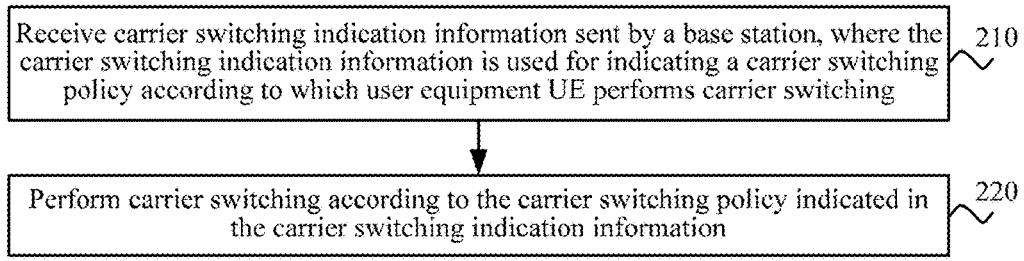
FIG. 5 is a schematic flowchart of a carrier switching method according to another embodiment of the present invention.

FIG. 5 is a schematic flowchart of a carrier switching method 200 according to another embodiment of the present invention. As shown in FIG. 5, the method 200 includes:

S210: Receive carrier switching indication information sent by a base station, where the carrier switching indication information is used for indicating a carrier switching policy according to which user equipment UE performs carrier switching.

S220: Perform carrier switching according to the carrier switching policy indicated in the carrier switching indication information.

Therefore, in the carrier switching method according to this embodiment of the present invention, UE having no carrier capability is enabled to dynamically perform switching between at least two carriers, so that quality of service of a service of the UE can be improved, user experience can be improved, and system performance can be improved.

Optionally, the carrier switching policy may include an uplink carrier switching policy and/or a downlink carrier switching policy. Correspondingly, the carrier switching policy includes completing carrier switching from a current downlink carrier to a target downlink carrier in an $M1^{th}$ subframe after a current subframe in which the carrier switching indication information sent by the base station is received, where M1 is an integer greater than or equal to 1.

Optionally, as another embodiment, the carrier switching policy includes completing carrier switching from a current uplink carrier to a target uplink carrier in an $M2^{th}$ subframe after the current subframe in which the carrier switching indication information sent by the base station is received, where M2 is an integer greater than or equal to 1.

In this case, the UE may complete, according to the carrier switching policy, switching in an $M1^{th}$ subframe after the current subframe and communicate with the base station in the subframe.

Optionally, as another embodiment, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Optionally, as another embodiment, the carrier switching indication information is carried in downlink control information DCI, where the DCI is further used for instructing the UE to receive downlink data on the current downlink carrier; or the carrier switching indication information is carried in DCI, where the DCI is further used for instructing the UE to send uplink data on the current uplink carrier or on the target uplink carrier to which carrier switching is performed; or the carrier switching indication information is carried in DCI, where the DCI is used for instructing the UE to perform carrier switching according to the carrier switching policy and is not used for data scheduling.

Optionally, as another embodiment, a carrier indicator field CIF included in the DCI is used for carrying the carrier switching indication information.

The CIF may be only used for instructing the UE to perform carrier switching, or may be both used for scheduling data transmission on the target uplink carrier, and used for instructing the UE to switch from the current uplink carrier to the target uplink carrier, but this embodiment of the present invention is not limited thereto.

Optionally, as another embodiment, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

A pair of system-associated uplink carrier and downlink carrier may correspond to a same cell identifier, and in this way, the UE may determine according to scrambling code information of the DCI to switch from the current uplink carrier to the target uplink carrier and/or switch from the current downlink carrier to the target downlink carrier, where the target uplink carrier and the target downlink carrier are system-associated carriers, and specifically, performing uplink carrier switching, performing downlink carrier switching or performing uplink and downlink carrier switching may be further determined according to other information, but this embodiment of the present invention is not limited thereto.

Optionally, as another embodiment, before S210, the method 200 further includes:

S230: Determine a primary-component-carrier subframe pattern of the UE, where the primary-component-carrier subframe pattern is used for instructing the UE to communicate with the base station in a first subframe by using a primary component carrier of the UE.

Correspondingly, S220: Perform carrier switching according to the carrier switching policy indicated in the carrier switching indication information includes:

S221: Perform carrier switching according to the carrier switching policy and the primary-component-carrier subframe pattern.

The primary-component-carrier subframe pattern may include a carrier subframe pattern of a primary uplink carrier and/or a carrier subframe pattern of a primary downlink carrier, the UE may preferably communicate with the base station by using the primary component carrier in a subframe reserved for the primary component carrier in the primary-component-carrier subframe pattern, and in this case, when the UE operates on a secondary component carrier, the UE may perform carrier switching, so as to switch to the primary component carrier, thereby ensuring that a carrier operating in the first subframe is the primary component carrier, but this embodiment of the present invention is not limited thereto.

Optionally, as another embodiment, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

Optionally, as another embodiment, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division duplex (TDD) configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Optionally, as another embodiment, before S210, the method 200 further includes:

S240: Send carrier switching capability information of the UE to the base station, so that the base station determines the carrier switching policy according to the carrier switching capability information.

Optionally, as another embodiment, the carrier switching capability information of the UE includes at least one piece of the following information: information about a quantity of carriers supported by the UE, information about a carrier frequency band supported by the UE and information about a carrier switching type supported by the UE.

Optionally, as another embodiment, before S210, the method 200 further includes:

S250: Receive first indication information sent by the base station, where the first indication information is used for indicating a candidate carrier set according to which the UE performs carrier switching and/or a switching time delay for which the UE performs carrier switching.

Therefore, in the carrier switching method according to this embodiment of the present invention, UE having no carrier capability is enabled to dynamically perform switching between at least two carriers, so that quality of service of a service of the UE can be improved, system load can be balanced, user experience can be improved and system performance can be improved.

It should be understood that the sequence numbers in the foregoing procedures do not mean an execution sequence; the execution sequence of the procedures should be determined according to functions and internal logic thereof, and should not constitute any limitation to the implementation process of the embodiment of the present invention.

The carrier switching methods according to the embodiments of the present invention are described in detail with reference to FIG. 1 to FIG. 5 above, and a base station, and user equipment according to embodiments of the present invention are described with reference to FIG. 6 to FIG. 9 below.

Figure 6:
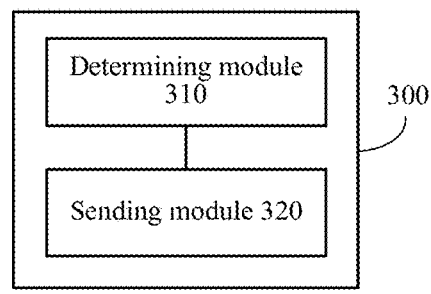
FIG. 6 is a schematic block diagram of a base station according to an embodiment of the present invention.

FIG. 6 is a schematic block diagram of a base station 300 according to an embodiment of the present invention. As shown in FIG. 6, the base station 300 includes:

a determining module 310, configured to determine, according to carrier switching capability information of user equipment UE, a carrier switching policy according to which the UE performs carrier switching; and a sending module 320, configured to send carrier switching indication information to the UE, where the carrier switching indication information is used for indicating the carrier switching policy determined by the determining module 310, so that the UE performs carrier switching according to the carrier switching policy.

Therefore, in the base station according to this embodiment of the present invention, UE having no carrier capability is enabled to dynamically perform switching between at least two carriers, so that quality of service of a service of the UE can be improved, user experience can be improved, and system performance can be improved.

Optionally, the determining module 310 is specifically configured to determine, according to the carrier switching capability information of the UE and current network status information, the carrier switching policy according to which the UE performs carrier switching.

Optionally, as another embodiment, the carrier switching policy determined by the determining module 310 includes completing carrier switching from a current downlink carrier to a target downlink carrier in an M1$^{th}$ subframe after a current subframe in which the carrier switching indication information is sent to the UE, where M1 is an integer greater than or equal to 1.

Optionally, as another embodiment, the carrier switching policy determined by the determining module 310 includes completing carrier switching from a current uplink carrier to a target uplink carrier in an M2$^{th}$ subframe after the current subframe in which the carrier switching indication information is sent to the UE, where M2 is an integer greater than or equal to 1.

Optionally, as another embodiment, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Optionally, as another embodiment, the sending module 320 is specifically configured to send downlink control information DCI carrying the carrier switching indication information, where the DCI is further used for instructing the UE to receive downlink data on the current downlink carrier; or the sending module 320 is specifically configured to send DCI carrying the carrier switching indication information, where the DCI is further used for instructing the UE to send uplink data on the current uplink carrier or on the target uplink carrier to which carrier switching is performed; or the sending module 320 is specifically configured to send DCI carrying the carrier switching indication information, where the DCI is used for instructing the UE to perform carrier switching according to the carrier switching policy.

Optionally, as another embodiment, a carrier indicator field CIF included in the DCI sent by the sending module 320 is used for carrying the carrier switching indication information.

Optionally, as another embodiment, the DCI sent by the sending module 320 is scrambled by using a cell identifier corresponding to a target carrier, so as to instruct the UE to switch from a current carrier to the target carrier; or the DCI sent by the sending module 320 instructs the UE to feed back channel state information of the target downlink carrier, so as to instruct the UE to switch from the current downlink carrier to the target downlink carrier.

Optionally, as another embodiment, the determining module 310 is further configured to: before the carrier switching policy according to which the UE performs carrier switching is determined according to the carrier switching capability information of the UE, determine a primary-component-carrier subframe pattern of the UE, where the primary-component-carrier subframe pattern is used for instructing the UE to communicate with the base station in a first subframe by using a primary component carrier of the UE; and determine the carrier switching policy of the UE according to the carrier switching capability information of the UE and the primary-component-carrier subframe pattern.

Optionally, as another embodiment, the carrier switching policy determined by the determining module 310 includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

Optionally, as another embodiment, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Optionally, as another embodiment, the base station 300 further includes:

a receiving module 330, configured to: before the determining module 310 determines, according to the carrier switching capability information of the UE, the carrier switching policy according to which the UE performs carrier switching, receive the carrier switching capability information of the UE that is sent by the UE.

Optionally, as another embodiment, the carrier switching capability information of the UE includes at least one piece of the following information: information about a quantity of carriers supported by the UE, information about a carrier frequency band supported by the UE and information about a carrier switching type supported by the UE.

Optionally, as another embodiment, the sending module 320 is further configured to: before the determining module 310 determines, according to the carrier switching capability information of the UE, the carrier switching policy according to which the UE performs carrier switching, send first indication information to the UE, where the first indication information is used for indicating a candidate carrier set according to which the UE performs carrier switching and/or a switching time delay for which the UE performs carrier switching.

The base station 300 according to this embodiment of the present invention may correspond to a base station in a carrier switching method according to an embodiment of the present invention, and the foregoing and other operations and/or functions of modules in the base station 300 are separately used for implementing corresponding processes of methods in FIG. 1 to FIG. 4, which are not described herein again for purpose of conciseness.

Therefore, in the base station according to this embodiment of the present invention, UE having no carrier capability is enabled to dynamically perform switching between at least two carriers, so that quality of service of a service of the UE can be improved, system load can be balanced, user experience can be improved and system performance can be improved.

Figure 7:
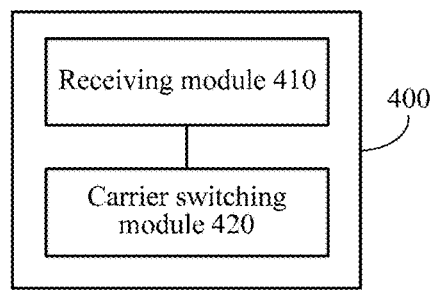
FIG. 7 is a schematic block diagram of user equipment according to an embodiment of the present invention.

FIG. 7 is a schematic block diagram of user equipment UE 400 according to an embodiment of the present invention. As shown in FIG. 7, the UE 400 includes:

a receiving module 410, configured to receive carrier switching indication information sent by a base station, where the carrier switching indication information is used for indicating a carrier switching policy according to which the user equipment UE performs carrier switching; and a carrier switching module 420, configured to perform carrier switching according to the carrier switching policy indicated in the carrier switching indication information received by the receiving module 410.

Therefore, in the user equipment according to this embodiment of the present invention, the UE having no carrier capability is enabled to dynamically perform switching between at least two carriers, so that quality of service of a service of the UE can be improved, user experience can be improved, and system performance can be improved.

Optionally, the carrier switching policy includes completing carrier switching from a current downlink carrier to a target downlink carrier in an $M1^{th}$ subframe after a current subframe in which the carrier switching indication information sent by the base station is received, where M1 is an integer greater than or equal to 1.

Optionally, as another embodiment, the carrier switching policy includes completing carrier switching from a current uplink carrier to a target uplink carrier in an $M2^{th}$ subframe after the current subframe in which the carrier switching indication information sent by the base station is received, where M2 is an integer greater than or equal to 1.

Optionally, as another embodiment, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Optionally, as another embodiment, the carrier switching indication information received by the receiving module 410 is carried in downlink control information DCI, where the DCI is further used for instructing the UE to receive downlink data on the current downlink carrier; or the carrier switching indication information received by the receiving module 410 is carried in DCI, where the DCI is further used for instructing the UE to send uplink data on the current uplink carrier or on the target uplink carrier to which carrier switching is performed; or the carrier switching indication information received by the receiving module 410 is carried in DCI, where the DCI is used for instructing the UE to perform carrier switching according to the carrier switching policy and is not used for data scheduling.

Optionally, as another implementation, a carrier indicator field CIF included in the DCI is used for carrying the carrier switching indication information.

Optionally, as another embodiment, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

Optionally, as another embodiment, the UE 400 further includes:

a determining module 430, configured to: before the carrier switching module 420 performs carrier switching according to the carrier switching policy, determine a primary-component-carrier subframe pattern of the UE, where the primary-component-carrier subframe pattern is used for instructing the UE to communicate with the base station in a first subframe by using a primary component carrier of the UE; and correspondingly, the carrier switching module 420 is specifically configured to perform carrier switching according to the carrier switching policy received by the receiving module 410 and the primary-component-carrier subframe pattern determined by the determining module 430.

Optionally, as another embodiment, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

Optionally, as another embodiment, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Optionally, as another embodiment, the UE 400 further includes:

a sending module 440, configured to: before the receiving module 410 receives the carrier switching indication information sent by the base station, send carrier switching capability information of the UE to the base station, so that the base station determines the carrier switching policy according to the carrier switching capability information.

Optionally, as another embodiment, the receiving module 410 is further configured to: before the carrier switching indication information sent by the base station is received, receive first indication information sent by the base station, where the first indication information is used for indicating a candidate carrier set according to which the UE performs carrier switching and/or a switching time delay for which the UE performs carrier switching.

The user equipment 400 according to this embodiment of the present invention may correspond to user equipment in a carrier switching method according to an embodiment of the present invention, and the foregoing and other operations and/or functions of modules in the user equipment 400 are separately used for implementing corresponding processes of methods in FIG. 5, which are not described herein again for purpose of conciseness.

Therefore, in the user equipment according to this embodiment of the present invention, the UE having no carrier capability is enabled to dynamically perform switching between at least two carriers, so that quality of service of a service of the UE can be improved, system load can be balanced, user experience can be improved and system performance can be improved.

Figure 8:
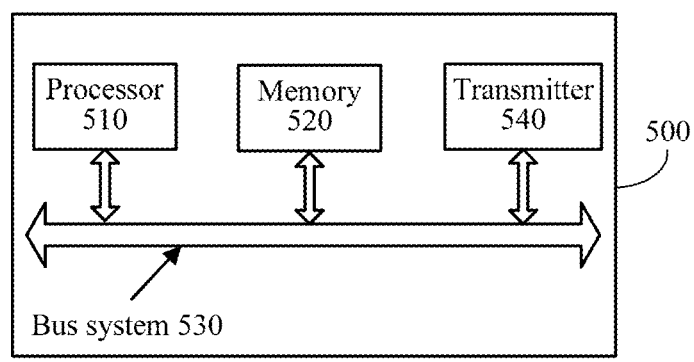
FIG. 8 is a schematic block diagram of a base station according to another embodiment of the present invention.

FIG. 8 is a schematic block diagram of a base station 500 according to an embodiment of the present invention. As shown in FIG. 8, the base station 500 includes a processor 510, a memory 520, a bus system 530 and a transmitter 540. The processor 510, the memory 520 and the transmitter 540 are connected by using the bus system 530, the memory 520 is configured to store an instruction, and the processor 510 invokes, by using the bus system 530, the instruction stored in the memory 520. Specifically, the processor 510 is configured to determine, according to carrier switching capability information of user equipment UE, a carrier switching policy according to which the UE performs carrier switching; and the transmitter 540 is configured to send carrier switching indication information to the UE, where the carrier switching indication information is used for indicating the carrier switching policy determined by the processor 510, so that the UE performs carrier switching according to the carrier switching policy.

Therefore, in the base station according to this embodiment of the present invention, UE having no carrier capability is enabled to dynamically perform switching between at least two carriers, so that quality of service of a service of the UE can be improved, user experience can be improved, and system performance can be improved.

It should be understood that, in this embodiment of the present invention, the processor 510 may be a central processing unit (CPU), and the processor 510 may be further another general-purpose processor, a digital signal processor (DSP), an application-specific integrated circuit (ASIC), a field programmable gate array (FPGA) or another programmable logic device, a discrete gate or a transistor logic device, a discrete hardware assembly or the like. The general-purpose processor may be a microprocessor, or the processor may be any common processor or the like.

The memory 520 may include a read-only memory and a random access memory, and provide an instruction and data to the processor 510. A part of the memory 520 may further include a non-volatile random access memory. For example, the memory 520 may further store information of a device type.

Besides including a data bus, the bus system 530 may further include a power supply bus, a control bus, a state signal bus and the like. However, for purpose of clear description, various buses are all marked as the bus system 530 in the figure.

During implementation, the steps of the foregoing method may be implemented by using a hardware integrated logic circuit in the processor 510 or implemented by using an instruction in a software form. The steps of the method disclosed with reference to the embodiment of the present invention may be implemented by means of the execution of the hardware processor, or implemented by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory 520, and the processor 510 reads the information in the memory 520, and completes steps of the foregoing method in combination with hardware of the processor 510. To avoid repetition, the details are not described herein again.

Optionally, the processor 510 is specifically configured to determine, according to the carrier switching capability information of the UE and current network status information, the carrier switching policy according to which the UE performs carrier switching.

Optionally, as another embodiment, the carrier switching policy determined by the processor 510 includes completing carrier switching from a current downlink carrier to a target downlink carrier in an M1$^{th}$ subframe after a current subframe in which the carrier switching indication information is sent to the UE, where M1 is an integer greater than or equal to 1.

Optionally, as another embodiment, the carrier switching policy determined by the processor 510 includes completing carrier switching from a current uplink carrier to a target uplink carrier in an M2$^{th}$ subframe after the current subframe in which the carrier switching indication information is sent to the UE, where M2 is an integer greater than or equal to 1.

Optionally, as another embodiment, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Optionally, as another embodiment, the transmitter 540 is specifically configured to send downlink control information (DCI) carrying the carrier switching indication information, where the DCI is further used for instructing the UE to receive downlink data on the current downlink carrier; or the transmitter 540 is specifically configured to send DCI carrying the carrier switching indication information, where the DCI is further used for instructing the UE to send uplink data on the current uplink carrier or on the target uplink carrier to which carrier switching is performed; or the transmitter 540 is specifically configured to send DCI carrying the carrier switching indication information, where the DCI is used for instructing the UE to perform carrier switching according to the carrier switching policy and is not used for data scheduling.

Optionally, as another embodiment, a carrier indicator field (CIF) included in the DCI sent by the transmitter 540 is used for carrying the carrier switching indication information.

Optionally, as another embodiment, the DCI sent by the transmitter 540 is scrambled by using a cell identifier corresponding to a target carrier, so as to instruct the UE to switch from a current carrier to the target carrier; or the DCI sent by the transmitter 540 instructs the UE to feed back channel state information of the target downlink carrier, so as to instruct the UE to switch from the current downlink carrier to the target downlink carrier.

Optionally, as another embodiment, the processor 510 is further configured to: before the carrier switching policy according to which the UE performs carrier switching is determined according to the carrier switching capability information of the UE, determine a primary-component-carrier subframe pattern of the UE, where the primary-component-carrier subframe pattern is used for instructing the UE to communicate with the base station in a first subframe by using a primary component carrier of the UE; and determine the carrier switching policy of the UE according to the carrier switching capability information of the UE and the primary-component-carrier subframe pattern.

Optionally, as another embodiment, the carrier switching policy determined by the processor 510 includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

Optionally, as another embodiment, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Optionally, as another embodiment, the base station 500 further includes a receiver 550, configured to: before the processor 510 determines, according to the carrier switching capability information of the UE, the carrier switching policy according to which the UE performs carrier switching, receive the carrier switching capability information of the UE that is sent by the UE.

Optionally, as another embodiment, the carrier switching capability information of the UE includes at least one piece of the following information: information about a quantity of carriers supported by the UE, information about a carrier frequency band supported by the UE and information about a carrier switching type supported by the UE.

Optionally, as another embodiment, the transmitter 540 is further configured to: before the processor 510 determines, according to the carrier switching capability information of the UE, the carrier switching policy according to which the UE performs carrier switching, send first indication information to the UE, where the first indication information is used for indicating a candidate carrier set according to which the UE performs carrier switching and/or a switching time delay for which the UE performs carrier switching.

The base station 500 according to this embodiment of the present invention may correspond to a base station in a carrier switching method according to an embodiment of the present invention, and the foregoing and other operations and/or functions of modules in the base station 500 are separately used for implementing corresponding processes of methods in FIG. 1 to FIG. 4, which are not described herein again for purpose of conciseness.

Therefore, in the base station according to this embodiment of the present invention, UE having no carrier capability is enabled to dynamically perform switching between at least two carriers, so that quality of service of a service of the UE can be improved, system load can be balanced, user experience can be improved and system performance can be improved.

Figure 9:
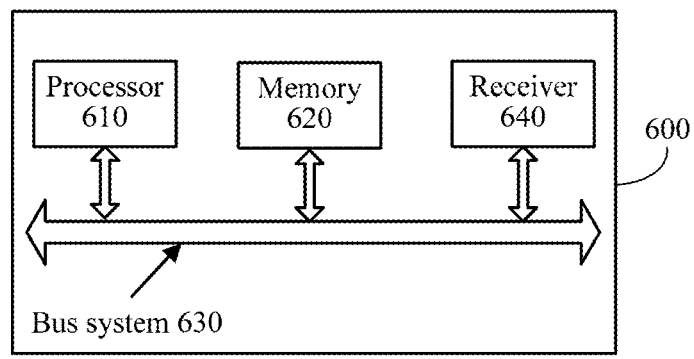
FIG. 9 is a schematic block diagram of user equipment according to another embodiment of the present invention.

FIG. 9 is a schematic block diagram of user equipment UE 600 according to an embodiment of the present invention. As shown in FIG. 9, the UE 600 includes: a processor 610, a memory 620, a bus system 630 and a receiver 640. The processor 610, the memory 620 and the receiver 640 are connected by using the bus system 630, the memory 620 is configured to store an instruction, and the processor 610 invokes, by using the bus system 630, the instruction stored in the memory 620. Specifically, the receiver 640 is configured to receive carrier switching indication information sent by a base station, where the carrier switching indication information is used for indicating a carrier switching policy according to which the user equipment UE performs carrier switching; and the processor 610 is configured to perform carrier switching according to the carrier switching policy indicated in the carrier switching indication information received by the receiver 640.

Therefore, in the user equipment according to this embodiment of the present invention, the UE having no carrier capability is enabled to dynamically perform switching between at least two carriers, so that quality of service of a service of the UE can be improved, user experience can be improved, and system performance can be improved.

It should be understood that, in this embodiment of the present invention, the processor 610 may be a central processing unit (CPU), and the processor 610 may be further another general-purpose processor, a digital signal processor (DSP), an application-specific integrated circuit (ASIC), a field programmable gate array (FPGA) or another programmable logic device, a discrete gate or a transistor logic device, a discrete hardware assembly or the like. The general-purpose processor may be a microprocessor, or the processor may be any common processor or the like.

The memory 620 may include a read-only memory and a random access memory, and provide an instruction and data to the processor 610. A part of the memory 620 may further include a non-volatile random access memory. For example, the memory 620 may further store information of a device type.

Besides including a data bus, the bus system 630 may further include a power supply bus, a control bus, a state signal bus and the like. However, for purpose of clear description, various buses are all marked as the bus system 630 in the figure.

During implementation, the steps of the foregoing method may be implemented by using a hardware integrated logic circuit in the processor 610 or implemented by using an instruction in a software form. The steps of the method disclosed with reference to the embodiment of the present invention may be implemented by means of the execution of the hardware processor, or implemented by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory 620, and the processor 610 reads the information in the memory 620, and completes steps of the foregoing method in combination with hardware of the processor 610. To avoid repetition, the details are not described herein again.

Optionally, the carrier switching policy includes completing carrier switching from a current downlink carrier to a target downlink carrier in an $M1^{th}$ subframe after a current subframe in which the carrier switching indication information sent by the base station is received, where M1 is an integer greater than or equal to 1.

Optionally, as another embodiment, the carrier switching policy includes completing carrier switching from a current uplink carrier to a target uplink carrier in an $M2^{th}$ subframe after the current subframe in which the carrier switching indication information sent by the base station is received, where M2 is an integer greater than or equal to 1.

Optionally, as another embodiment, when the current downlink carrier and the current uplink carrier in the carrier switching policy are system-associated carriers, and the target downlink carrier and the target uplink carrier to which the UE performs carrier switching are system-associated carriers, a time needed to switch the UE from the current downlink carrier to the target downlink carrier is equal to a time needed to switch the UE from the current uplink carrier to the target uplink carrier.

Optionally, as another embodiment, the carrier switching indication information received by the receiver 640 is carried in downlink control information (DCI), where the DCI is further used for instructing the UE to receive downlink data on the current downlink carrier; or the carrier switching indication information received by the receiver 640 is carried in DCI, where the DCI is further used for instructing the UE to send uplink data on the current uplink carrier or on the target uplink carrier to which carrier switching is performed; or the carrier switching indication information received by the receiver 640 is carried in DCI, where the DCI is used for instructing the UE to perform carrier switching according to the carrier switching policy and is not used for data scheduling.

Optionally, as another implementation, a carrier indicator field (CIF) included in the DCI is used for carrying the carrier switching indication information.

Optionally, as another embodiment, the DCI is scrambled by using a cell identifier corresponding to a target carrier, so as to instruct the UE to switch from a current carrier to the target carrier; or the DCI instructs the UE to feed back channel state information of the target downlink carrier, so as to instruct the UE to switch from the current downlink carrier to the target downlink carrier.

Optionally, as another embodiment, the processor 610 is further configured to: before carrier switching is performed according to the carrier switching policy, determine a primary-component-carrier subframe pattern of the UE, where the primary-component-carrier subframe pattern is used for instructing the UE to communicate with the base station in a first subframe by using a primary component carrier of the UE; and perform carrier switching according to the carrier switching policy received by the receiver 640 and the primary-component-carrier subframe pattern.

Optionally, as another embodiment, the carrier switching policy includes carrier subframe patterns of at least two carriers, a carrier subframe pattern of each carrier of the at least two carriers is separately used for indicating a reserved subframe in which the UE communicates with a base station by using the carrier, and the carrier subframe patterns of the carriers are not completely overlapped.

Optionally, as another embodiment, a first subframe ratio in the at least two carriers is a reciprocal of a second subframe ratio, the first subframe ratio is a ratio between a quantity of reserved subframes of a first uplink carrier and a quantity of reserved subframes of a first downlink carrier, where the first uplink carrier and the first downlink carrier of the at least two carriers are system-associated, and a relative relationship between a location of a reserved subframe of the first uplink carrier and a location of a reserved subframe of the first downlink carrier satisfies a preset first TDD ratio configuration, where the second subframe ratio is a ratio between a quantity of reserved subframes of a second uplink carrier and a quantity of reserved subframes of a second downlink carrier, where the second uplink carrier and the second downlink carrier of the at least two carriers are system-associated; or a ratio between subframes of a carrier subframe pattern of a third downlink carrier and subframes of a carrier subframe pattern of a fourth downlink carrier of the at least two carriers is a first TDD configuration of seven preset time division multiplexing TDD configurations, where the carrier subframe pattern of the third downlink carrier corresponds to downlink and special subframes of the first TDD configuration, and the carrier subframe pattern of the fourth downlink carrier corresponds to an uplink subframe of the first TDD configuration.

Optionally, as another embodiment, the UE 600 further includes:

a transmitter 650, configured to: before the receiver 640 receives the carrier switching indication information sent by the base station, send carrier switching capability information of the UE to the base station, so that the base station determines the carrier switching policy according to the carrier switching capability information.

Optionally, as another embodiment, the receiver 640 is further configured to: before the carrier switching indication information sent by the base station is received, receive first indication information sent by the base station, where the first indication information is used for indicating a candidate carrier set according to which the UE performs carrier switching and/or a switching time delay for which the UE performs carrier switching.

The user equipment 600 according to this embodiment of the present invention may correspond to user equipment in a carrier switching method according to an embodiment of the present invention, and the foregoing and other operations and/or functions of modules in the user equipment 600 are separately used for implementing corresponding processes of methods in FIG. 5, which are not described herein again for purpose of conciseness.

Therefore, in the user equipment according to this embodiment of the present invention, the UE having no carrier capability is enabled to dynamically perform switching between at least two carriers, so that quality of service of a service of the UE can be improved, system load can be balanced, user experience can be improved and system performance can be improved.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed operating process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A carrier switching method, comprising:
   determining, by a base station, according to carrier switching capability information of user equipment (UE), a carrier switching policy according to which the UE performs carrier switching, wherein the carrier switching capability information of the UE comprises information about a quantity of carriers supported by the UE, and wherein the carrier switching policy includes:
      an uplink carrier switching policy wherein the UE switches from a current uplink carrier to a target uplink carrier, and keeps a downlink carrier unchanged, or
      a downlink carrier switching policy wherein the UE switches from a current downlink carrier to a target downlink carrier, and keeps an uplink carrier unchanged; and
   sending, by the base station, carrier switching indication information to the UE, wherein the carrier switching indication information is carried in downlink control information (DCI) to indicate the carrier switching policy and to enable the UE to perform carrier switching between the at least two carriers according to the carrier switching policy, and wherein the DCI instructs the UE to feed back channel state information of the target downlink carrier, so as to instruct the UE to switch from the current downlink carrier to the target downlink carrier.

2. The carrier switching method according to claim 1, wherein the carrier switching policy comprises:
   completing carrier switching from a current downlink carrier to a target downlink carrier in an M1th subframe after a current subframe in which the carrier switching indication information is sent to the UE, wherein M1 is an integer greater than or equal to 1; or
   completing carrier switching from a current uplink carrier to a target uplink carrier in an M2th subframe after the current subframe in which the carrier switching indication information is sent to the UE, wherein M2 is an integer greater than or equal to 1.

3. The carrier switching method according to claim 1, wherein the DCI comprises information for instructing the UE to:
   receive downlink data on the current downlink carrier; or
   send uplink data on the current uplink carrier or on the target uplink carrier to which carrier switching is performed; or
   perform carrier switching according to the carrier switching policy and is not used for data scheduling.

4. The carrier switching method according to claim 1, wherein a carrier indicator field (CIF) comprised in the DCI is used for carrying the carrier switching indication information.

5. The carrier switching method according to claim 1, wherein:
the DCI is scrambled by using a cell identifier corresponding to a target carrier for instructing the UE to switch from a current carrier to the target carrier.

6. The carrier switching method according to claim 1, wherein before determining, according to carrier switching capability information of UE, a carrier switching policy according to which the UE performs carrier switching, the method further comprises:
receiving the carrier switching capability information of the UE from the UE.

7. The carrier switching method according to claim 1, wherein the carrier switching capability information of the UE comprises at least one piece of the following information: information about a carrier frequency band supported by the UE, and information about a carrier switching type supported by the UE.

8. The carrier switching method according to claim 1, wherein before determining, according to carrier switching capability information of UE, a carrier switching policy according to which the UE performs carrier switching, the method further comprises:
sending first indication information to the UE for indicating a candidate carrier set according to which the UE performs carrier switching and/or a switching time delay for which the UE performs carrier switching.

9. A carrier switching method, comprising:
sending carrier switching capability information of a user equipment (UE) to a base station, by the UE, for determining the carrier switching policy according to the carrier switching capability information, wherein the carrier switching capability information of the UE comprises information about a quantity of carriers supported by the UE;
receiving, by the UE, carrier switching indication information from the base station, wherein the carrier switching indication information is carried in downlink control information (DCI) for indicating a carrier switching policy according to which the UE performs carrier switching between at least two carriers, and wherein the carrier switching policy includes:
an uplink carrier switching policy wherein the UE switches from a current uplink carrier to a target uplink carrier, and keeps a downlink carrier unchanged, or
a downlink carrier switching policy wherein the UE switches from a current downlink carrier to a target downlink carrier, and keeps an uplink carrier unchanged; and
performing, by the UE, carrier switching according to the carrier switching policy indicated in the carrier switching indication information, wherein the DCI instructs the UE to feed back channel state information of the target downlink carrier, so as to instruct the UE to switch from the current downlink carrier to the target downlink carrier.

10. The carrier switching method according to claim 9, wherein the carrier switching policy comprises:
completing carrier switching from a current downlink carrier to a target downlink carrier in an M1th subframe after a current subframe in which the carrier switching indication information from the base station is received, wherein M1 is an integer greater than or equal to 1; or
completing carrier switching from a current uplink carrier to a target uplink carrier in an M2th subframe after the current subframe in which the carrier switching indication information from the base station is received, wherein M2 is an integer greater than or equal to 1.

11. The carrier switching method according to claim 9, wherein the DCI comprises information for instructing the UE to:
receive downlink data on the current downlink carrier; or
send uplink data on the current uplink carrier or on the target uplink carrier to which carrier switching is performed; or
perform carrier switching according to the carrier switching policy and is not used for data scheduling.

12. The carrier switching method according to claim 9, wherein a carrier indicator field (CIF) comprised in the DCI is used for carrying the carrier switching indication information.

13. The carrier switching method according to claim 9, wherein:
the DCI is scrambled by using a cell identifier corresponding to a target carrier for instructing the UE to switch from a current carrier to the target carrier.

14. The carrier switching method according to claim 9, wherein the carrier switching capability information of the UE further comprises at least one piece of the following information: information about a carrier frequency band supported by the UE, or information about a carrier switching type supported by the UE.

15. The carrier switching method according to claim 9, wherein before receiving carrier switching indication information from a base station, the method further comprises:
receiving first indication information from the base station for indicating a candidate carrier set according to which the UE performs carrier switching and/or a switching time delay for which the UE performs carrier switching.

16. A base station, comprising:
a processor, configured to determine, according to carrier switching capability information of user equipment (UE), a carrier switching policy according to which the UE performs carrier switching, wherein the carrier switching capability information of the UE comprises information about a quantity of carriers supported by the UE, and wherein the carrier switching policy includes:
an uplink carrier switching policy wherein the UE switches from a current uplink carrier to a target uplink carrier, and keeps a downlink carrier unchanged, or
a downlink carrier switching policy wherein the UE switches from a current downlink carrier to a target downlink carrier, and keeps an uplink carrier unchanged; and
a transmitter, configured to send carrier switching indication information to the UE carried in downlink control information (DCI) to indicate the carrier switching policy determined by the processor and to enable the UE to perform carrier switching between at least two carriers according to the carrier switching policy, wherein the DCI instructs the UE to feed back channel state information of the target downlink carrier, so as to instruct the UE to switch from the current downlink carrier to the target downlink carrier.

17. The base station according to claim 16, wherein the carrier switching policy determined by the processor comprises:
- completing carrier switching from a current downlink carrier to a target downlink carrier in an M1th subframe after a current subframe in which the carrier switching indication information is sent to the UE, wherein M1 is an integer greater than or equal to 1; or
- completing carrier switching from a current uplink carrier to a target uplink carrier in an M2th subframe after the current subframe in which the carrier switching indication information is sent to the UE, wherein M2 is an integer greater than or equal to 1.

18. The base station according to claim 16, wherein the DCI comprises information for instructing the UE to:
- receive downlink data on the current downlink carrier; or
- send uplink data on the current uplink carrier or on the target uplink carrier to which carrier switching is performed; or
- perform carrier switching according to the carrier switching policy and is not used for data scheduling.

19. The base station according to claim 16, wherein a carrier indicator field (CIF) comprised in the DCI from the transmitter is used for carrying the carrier switching indication information.

* * * * *